US007289763B2

(12) United States Patent
Dennison et al.

(10) Patent No.: US 7,289,763 B2
(45) Date of Patent: *Oct. 30, 2007

(54) CELLULAR TELEPHONE SYSTEM THAT USES POSITION OF A MOBILE UNIT TO MAKE CALL MANAGEMENT DECISIONS

(75) Inventors: Everett Dennison, Canfield, OH (US); Timothy J. Duffy, West Middlesex, PA (US); Gregory T Pauley, Canfield, OH (US); Scott L. Jones, Sharon, PA (US); Albert H. Pharis, Jr., Canfield, OH (US); Warren P. Williamson, IV, Loveland, OH (US)

(73) Assignee: Emsat Advanced Geo-Location Technology, LLP, Loveland, OH (US)

( * ) Notice: Subject to any disclaimer, the term of this patent is extended or adjusted under 35 U.S.C. 154(b) by 311 days.

This patent is subject to a terminal disclaimer.

(21) Appl. No.: 10/993,477

(22) Filed: Nov. 22, 2004

(65) Prior Publication Data

US 2005/0075114 A1    Apr. 7, 2005

Related U.S. Application Data

(60) Division of application No. 09/662,613, filed on Sep. 15, 2000, now Pat. No. 6,847,822, which is a continuation of application No. 08/848,082, filed on Mar. 21, 1996, now Pat. No. 6,324,404, which is a continuation-in-part of application No. 08/555,884, filed on Oct. 23, 1995, now Pat. No. 5,546,445, which is a continuation-in-part of application No. 08/402,976, filed on Mar. 13, 1995, now abandoned, which is a continuation of application No. 08/057,833, filed on May 7, 1993, now abandoned, which is a continuation of application No. 07/813,494, filed on Dec. 26, 1991, now Pat. No. 5,235,633.

(51) Int. Cl.
    *H04B 7/185*    (2006.01)

(52) U.S. Cl. .................. 455/12.1; 455/13.1; 455/33.1; 455/33.2; 455/54.1
(58) Field of Classification Search ............. 455/456.1, 455/456.3, 456.5, 440, 404.2, 405–408, 479, 455/445, 435.1, 404.1, 12.1, 13.2, 33.2; 379/133, 379/114.01, 121.01, 134, 114, 121, 60
See application file for complete search history.

(56) References Cited

U.S. PATENT DOCUMENTS 3,662,267 A    5/1972    Reed .......................... 455/456

(Continued)

FOREIGN PATENT DOCUMENTS

EP    199266    4/1986

(Continued)

OTHER PUBLICATIONS

*Billing Systems; they aren't just for billing anymore.* Cellular Business, vol. 9, No. 12, p. 24, Nov. 1992.

(Continued)

*Primary Examiner*—Nay Maung
*Assistant Examiner*—Richard Chan
(74) *Attorney, Agent, or Firm*—Vista IP Law Group LLP

(57) ABSTRACT

A cellular telephone system has call management decisions made based on the exact geographic location of the mobile unit. These call management decisions include billing and taxing decisions, cell site selection, frequency selection and even cellular system selection. The decisions are continuously updated during a call whereby decisions can be made and changed regardless of where a call originated. Cell site location, and even cellular system selection, can be made in a specific manner to best serve the needs of the mobile user, the cellular system as well as the public. It is even possible for a cellular system to locate one or more of its cell sites in the geographic area served by another cellular system. In some cases, cellular systems might even share cell sites.

32 Claims, 19 Drawing Sheets

U.S. PATENT DOCUMENTS

| | | |
|---|---|---|
| 4,144,411 A | 3/1979 | Frenkiel ........................ 379/60 |
| 4,161,734 A | 7/1979 | Anderson ................... 342/457 |
| 4,177,466 A | 12/1979 | Reagan |
| 4,229,620 A | 10/1980 | Schnaible ................... 342/458 |
| 4,232,317 A | 11/1980 | Freeny, Jr. ................... 342/464 |
| 4,233,473 A | 11/1980 | Frost ........................... 379/59 |
| 4,545,071 A | 10/1985 | Freeburg .................... 455/456 |
| 4,700,374 A * | 10/1987 | Bini ......................... 455/456.2 |
| 4,724,538 A | 2/1988 | Farrell ......................... 455/404 |
| 4,788,711 A | 11/1988 | Nasco, Jr. .................... 379/69 |
| 4,799,062 A | 1/1989 | Sanderford ................. 342/457 |
| 4,812,852 A | 3/1989 | Bent ........................... 342/457 |
| 4,818,998 A | 4/1989 | Apsell et al. |
| 4,888,593 A | 12/1989 | Friedman ................... 342/457 |
| 4,908,629 A | 3/1990 | Apsel et al. |
| 4,914,651 A | 4/1990 | Lusignan |
| 4,939,522 A | 7/1990 | Newstead ................... 342/457 |
| 4,972,456 A | 11/1990 | Kaczmarek ................. 379/59 |
| 4,977,399 A | 12/1990 | Price ........................... 379/59 |
| 5,043,736 A | 8/1991 | Darnell et al. .............. 342/367 |
| 5,054,110 A | 10/1991 | Comroe et al. .............. 379/59 |
| 5,056,109 A * | 10/1991 | Gilhousen et al. .......... 370/342 |
| 5,081,667 A | 1/1992 | Drori et al. |
| 5,081,703 A | 1/1992 | Lee .............................. 455/13 |
| 5,086,452 A | 2/1992 | Ito et al. ....................... 379/58 |
| 5,093,925 A | 3/1992 | Chanroo ...................... 379/59 |
| 5,155,689 A | 10/1992 | Wortham |
| 5,170,490 A | 12/1992 | Cannon et al. .............. 455/72 |
| 5,187,805 A | 2/1993 | Bertiger et al. |
| 5,214,789 A | 5/1993 | George ........................ 455/33 |
| 5,218,716 A | 6/1993 | Comroe |
| 5,222,249 A | 6/1993 | Carney |
| 5,223,844 A | 6/1993 | Mansell et al. |
| 5,227,802 A | 7/1993 | Pullman et al. |
| 5,235,633 A | 8/1993 | Dennison et al. ............. 379/60 |
| 5,260,968 A | 11/1993 | Gardner et al. |
| 5,278,892 A | 1/1994 | Bolliger et al. |
| 5,299,132 A | 3/1994 | Wortham |
| 5,303,297 A | 4/1994 | Hillis .......................... 455/406 |
| 5,309,474 A | 5/1994 | Gilhousen et al. |
| 5,311,197 A | 5/1994 | Sorden ....................... 342/457 |
| 5,315,636 A | 5/1994 | Patel |
| 5,317,323 A | 5/1994 | Kennedy |
| 5,319,374 A | 6/1994 | Desai |
| 5,321,514 A | 6/1994 | Martinez .................... 348/723 |
| 5,327,144 A | 7/1994 | Stilip |
| 5,334,974 A | 8/1994 | Simms et al. |
| 5,343,393 A | 8/1994 | Hirano et al. |
| 5,343,512 A | 8/1994 | Wang .......................... 342/457 |
| 5,361,399 A | 11/1994 | Linquist et al. |
| 5,365,450 A | 11/1994 | Schuchman ................. 342/457 |
| 5,365,451 A | 11/1994 | Wang .......................... 342/457 |
| 5,365,516 A | 11/1994 | Jandrell |
| 5,375,140 A | 12/1994 | Bustamante et al. |
| 5,382,958 A | 1/1995 | FitzGeerald ................ 342/457 |
| 5,390,124 A | 2/1995 | Kyrtsos ...................... 342/457 |
| 5,390,125 A | 2/1995 | Sennott ....................... 342/457 |
| 5,390,339 A | 2/1995 | Bruckert et al. |
| 5,392,287 A | 2/1995 | Tiedemann, Jr. |
| 5,396,540 A | 3/1995 | Gooch |
| 5,398,190 A | 3/1995 | Wortham |
| 5,410,728 A | 4/1995 | Bertiger et al. |
| 5,418,537 A | 5/1995 | Bird ........................... 342/457 |
| 5,430,656 A | 7/1995 | Dekel ......................... 342/457 |
| 5,452,211 A | 9/1995 | Kyrtsos ...................... 342/457 |
| 5,546,445 A | 8/1996 | Dennison et al. ........... 455/456 |
| 5,727,057 A | 3/1998 | Emery et al. .......... 379/201.07 |
| 6,324,404 B1 | 11/2001 | Dennison et al. ......... 455/456.3 |

FOREIGN PATENT DOCUMENTS

| | | |
|---|---|---|
| FR | 398773 | 4/1990 |
| GB | 292162 | 11/1988 |
| JP | 2-210923 | 8/1990 |
| WO | 01242 | 2/1992 |

OTHER PUBLICATIONS

*The Pseudo-Synchronisation. A Costless Feature to Obtain the Gains of a Synchronised Cellular Network*, Nov. 1992 Nice. Valbonne, FR.

*Real Time*, Billing World, Jul. Aug. 1995, pp. 39-40.

AT&T, *TNT 203-29* Oct. 7, 1992, pp. 17-39, Jun. 1996.

Preliminary Response dated Jun. 21, 1996 for related U.S. Appl. No. 08/670,281, filed Jun. 21, 1996; Inventor Everett Dennison (4 pages).

Office Action dated Mar. 25, 1996 for related U.S. Appl. No. 08/555,884, filed Oct. 23, 1995; Inventor Everett Dennison (11 pages).

* cited by examiner

CELLULAR TELEPHONE SYSTEM THAT USES POSITION OF A MOBILE UNIT TO MAKE CALL MANAGEMENT DECISIONS

CROSS REFERENCE TO RELATED APPLICATIONS

The present application is a divisional of U.S. application Ser. No. 09/662,613 filed Sep. 15, 2000 now U.S. Pat. No. 6,847,822, now allowed, which is a continuation of U.S. application Ser. No. 08/848,082, filed Mar. 21, 1996, now U.S. Pat. No. 6,324,404, which is a continuation-in-part of U.S. application Ser. No. 08/555,884, filed Oct. 23, 1995, now U.S. Pat. No. 5,546,445, which is a continuation-in-part of U.S. application Ser. No. 08/402,976, filed Mar. 13, 1995, now abandoned, which is a continuation of U.S. application Ser. No. 08/057,833, filed May 7, 1993, now abandoned, which is a continuation of U.S. application Ser. No. 07/813,494, filed Dec. 26, 1991 and issued as U.S. Pat. No. 5,235,633. The disclosures of each of these applications is fully incorporated herein by reference. Therefore, as used hereinafter, the term "prior art" refers to art that is relevant prior to the invention dates associated with this incorporated material.

FIELD OF THE INVENTION

The present invention relates to the general art of wireless over-the-air communication, which includes cellular mobile radiotelephone (CMR) technology, and to the particular field of managing communication processes in a wireless over-the-air communication system.

BACKGROUND OF THE INVENTION

The present invention is concerned with wireless over-the-air communication using a plurality of transmit/receive cell sites or relay points. It should be understood that the transmit/receive relay points can be either land based or non-land based, such as satellite based, and that as used herein, the term "cell site" or its equivalent refers to one of the relay points of the system. CMR (Cellular Mobile Radio) is an example of one type of wireless over-the-air communication system that can be included in the present disclosure. It is understood that the term CMR is not intended to be limiting, but is merely used as an example for the purposes of discussion. It is also to be understood that the term "cellular telephone system" or its equivalents is intended to be shorthand notation for the term "wireless over-the-air communications system" and no limitation is intended by the use of the term "cellular." Also, as used herein, the terms "CD (Communication Device)" and "MU (Mobile Unit)" are intended to include any device used to communicate in the wireless over-the-air communication system. Also, the term "cellular telephone system" is used for purposes of discussion but can include any form of wireless over-the-air communication system. It is also noted that many forms of communication are and will be conducted over the wireless over-the-air networks. Therefore, the present disclosure will refer to a "communication process" which is intended to cover calls as well as other forms of communication that can be conducted in this manner.

CMR is a rapidly growing telecommunications system. The typical CMR system includes a multiplicity of cells. A particular geographic area can be subdivided into a multiplicity of subareas, with each of the subareas being serviced by a stationary transmitter/receiver setup. The cells are set up to carry signals to and from mobile units in the range of the cell. If one cell site becomes too crowded, it can be divided into smaller cells, by a process known as cell site splitting. Any particular geographic area can become quite complicated with cells overlapping each other, and overlapping cells of other neighboring cellular systems. Further, null zones with inadequate coverage, or even no coverage, can result. It is noted that the term "cellular" is intended to be a term of convenience, and is not intended to be limiting. The present disclosure is intended to encompass any communication system in which an overall area can be divided into one or more subareas, and also to any communication system having at least some portion of the communications occurring over the air.

A typical CMR set up is indicated in FIGS. 1 and 2, and will be described so an understanding of the problem to which this invention is directed can be obtained.

FIG. 1 shows a typical cellular telephone unit having a unique mobile identification number stored in a suitable location such as an electrically erasable programmable read-only memory. Telephone units of this kind are known to those skilled in this art, and thus will not be described in detail.

The telephone unit includes a handset 4 having a keypad 5 as well as a speaker 6 and a microphone 7. A transceiver 8, ordinarily built into the telephone unit, exchanges signals via an antenna 10 with a mobile telecommunications switching office or MTSO 12 via a cell site 14. A duplexer 15 connects the antenna to the transceiver. The cell site 14 includes an antenna 16 connected to a control terminal 17 via a transceiver 18. The cell site 14 is connected to the MTSO via a transmission link 20. The Mobile Telephone Switching Office has historically been known as the center of the wireless over-the-air communications system. It is where the communication process management decisions are made, billing records are produced and where maintenance activities are initiated for wireless over-the-air communications systems. The MTSO is not a specific piece of equipment, but is comprised of many individual pieces. The MTSO will contain a telephone switch, peripheral processors, adjunct processors, and various other information gathering equipment used in the operation and management of a wireless over-the-air communications system. Each of the different pieces of equipment may directly or indirectly be involved providing the highest quality connection possible. The makeup of the MTSO therefore comprises many different pieces of equipment and many components, which can be supplied by different vendors. Therefore, communication process management decisions made at the MTSO can actually, be made outside of a switch and can be made in a cluster of nodes housed along the network or even in separate cell sites. Therefore, as used herein the term MTSO really refers to all of the systems, nodes, modules, equipment and components that combine to define a wireless over-the-air communication process management network, regardless of the physical or system location of these elements. The term MTSO therefore is not intended to be limiting to the "switching office" as it may have been viewed in the prior art. The term is intended to be much broader than that and to include any combinations of equipment, etc. That may be connected within the communication processing network of the service provider. The term MTSO is one of convenience and is intended to include all the information processing hardware and software associated with the wireless over-the-air communication process management process within a wireless over-the-air system, no matter where the hardware or software is located in the system. It is also noted that the term "intra-system" refers to actions and components within a particular system; whereas, the term "inter-system" refers to actions and components located outside a particular system.

Referring to FIGS. 1 and 2, the operation of the CMR can be understood. The mobile unit M moves about the geographic areas covered by the various cells. As that mobile unit moves about, it decodes the overhead message control signals generated by various cell site control channels. The mobile unit locks onto the cell site that is emitting the strongest signal. The mobile unit rescans channels periodically to update its status. If, for example, a fixed-position land-based telephone T is used to call the mobile unit, a signal is sent via landlines L, to the central office CO of a public/switched telephone system (PTSN) 12A. This system then utilizes the switching network SN associated therewith to call the MTSO 12 via a transmission link L1. The MTSO then utilizes its own switching network and generates a page request signal to cell sites via transmission links, such as the transmission link 20. The cell site which has been notified of the presence of the mobile unit M sends a signal back to the MTSO via the landlines or wireless links alerting the MTSO of the presence of the mobile unit. The MTSO then orders the mobile unit, via the notifying cell site, to tune to an assigned channel and receive the communication process.

On the other hand, during communication process origination, the mobile unit rescans the control channels to determine which is the best server based on signal strength. Upon selecting the best server, the mobile unit transmits cell site information on the control channel receive frequency and then receives a voice channel to tune to if the mobile unit is authorized to place a communication process.

As the mobile unit moves, the signal strength between that mobile unit and the originating cell site changes, and perhaps diminishes. Since signal strength is an inverse function of the square of the distance between the mobile unit and the cell site, signal strength can change rapidly and drastically as the mobile unit moves with respect to the cell site and therefore must be monitored closely. The MTSO has a signal strength table, and signal strength from the mobile unit is constantly compared to acceptable signal strength levels in the table. Such a table can be located in each cell site if desired.

Should signal strength diminish below a preset range, the MTSO generates a "locate request" signal to all cell sites that neighbor the original cell site. Each of such neighboring cell sites receiving a signal from the mobile unit signals the MTSO, and the signal strengths from such neighboring cell sites are checked against the signal strength table. The MTSO makes a decision as to which cell site should control the communication process, and notifies the original cell site to order the mobile unit to retune to a voice channel of the new cell site.

As soon as the mobile unit retunes, the mobile unit completes the communication process via the new cell site channel. This transfer of control is known as a handoff.

Typically, governments grant rights to provide wireless communication services to a specified land area based on geographic boundaries. Since wireless propagation does not end at exact geographic boundaries, many conflicts have arisen between service providers as to which service provider should provide service at the location from where the Communication Process (CP) is being originated or received. Today, there are no methods or procedures to resolve these issues. A Communication Process (CP) can be defined as the exchange of information between communication devices, such as, but not limited to, Analog or Digital radiotelephones, digital data communications, analog or digital video, and the like.

When the initial wireless systems were built, they were constructed around major metropolitan areas. This created service voids between major metropolitan markets. In these early systems, boundary service problems did not arise because there were areas of "no service" buffering competing systems. Today, as rural systems fill in the patchwork of nationwide coverage, network service provision boundary disputes are becoming common. Prior to the Dennison, et al patent, U.S. Pat. No. 5,235,633 and the patents and applications depending therefrom as continuations and continuations-in-part, the disclosures of which are fully incorporated hereinto by reference, and the invention disclosed herein, it was impossible to honor the exact geographic boundaries. Attempts are currently made to control coverage boundaries by installing directional antennas and adjusting cell site receive and transmit parameters. The methods used to match the system boundaries to the geographic boundaries are not entirely successful due to the variations in terrain, environment and limitations of antenna design and wireless propagation. A common result of these problems is inadequate wireless signal strength or null coverage and border disputes around the geographic boundaries and hence poor service.

The incorporated material, including the Dennison et al patent disclose that cell sites sometimes have overlapping coverage due to the aforementioned variations in terrain and environment, and propose a solution. While the proposed solution works well, there is still room for further improvement in the areas of cost, subscriber service, billing and taxing.

Furthermore, wireless propagation, such as but not limited to the cellular operating band of 800-900 MHz, is generally line-of-site transmission. This presents substantial challenges when choosing sites in which to place wireless transmit/receive antennas. Boundaries assigned to service providers are based on maps depicting the geographic borders of service boundaries. The question arises in a disputed territory of who will get to service the Communications Process (CP). In the past, it has been the cell site that can provide the highest signal strength from the CD (Communications Device), not the provider that owns the legal territorial rights to the Communication Process (CP) that has serviced the Communication Process (CP). Until the invention disclosed herein, the service provider that could receive the best signal would handle the communication process (CP), and depending on whether the Communication Process (CP) was handed off and/or depending on the agreement made between the wireless communication systems, possibly keep all of the revenue from the communication process CP. Additionally, with real estate values being very high in established communities, cell sites are harder to construct and more expensive to build. Each cell site must be optimized for the maximum effective coverage area to overcome the real estate problems encountered when constructing a cell site. This in turn creates problems with overlapping coverage between wireless systems and thus disputes over which wireless system handles the communication process. Further, due to business considerations, it may be economically advantageous for one wireless system to own a cell site which is geographically located in the geographic area of another wireless system.

Cell sites are very expensive to install and maintain, so there is a very real savings for a service provider if fewer cell sites could be constructed while also improving coverage.

Another area that would be affected by this is problems of quality service. This is because the service provider has conflicting requirements. To provide good coverage next to borders the provider would like to have high signal strength. To allow for hand-offs between cell sites and networks the signal strength needs to "fade out" at just the right level near the border to invoke a low threshold to start a hand-off process. It would be ideal to have high signal strength right up to a geographic boundary and then drop off beyond that boundary. However, at the present time, presently available systems do not permit this type of coverage.

Some areas inherently have wireless propagation problems, such as service areas next to bodies of water or in steep valleys. Wireless propagation can provide some very undesirable results for a number of reasons, some of which have been mentioned above and in the incorporated material. Therefore, there is a need to provide each network information as to which system has a right to handle a Communications Process (CP). For instance, a communications device (CD) might attempt to select a geographically incorrect service provider. Therefore, there is a need for a system that will permit a service provider to redirect the communication process to the geographically correct service provider, especially in a manner that is transparent to the Communications Device (CD) user.

Since cellular system geographic borders can be non-linear and can have irregular shapes, problems can arise. Problems associated with irregular boundaries are indicated in FIG. 3. FIG. 3 graphically shows the problem of obtaining coverage for areas that have irregular boundaries. In this figure, areas A and C are serviced by Carrier X, and area B is serviced by Carrier Y. It is noted that areas A and C are intra-system with respect to Carrier X and area B is intra-system with respect to Carrier Y, while areas A and C are inter-system with respect to Carrier Y and area B is inter-system with respect to Carrier X. It is also noted that areas A and B could be covered by just one cell site each but the overlap into adjacent territories would be difficult to resolve. Today, areas such as these would be split into two or more cell sites. For instance, Carrier X might elect to install three cell sites A1, A3 and A4 which provides a minimum of overlap into area B. Overlap is indicated at the shaded areas. Therefore, there is a need for a system what would allow Carrier X to install a cell site with a larger coverage area such as A2 (shown in dotted lines).

FIG. 4 shows a prior art attempt of providing sectored cells. Using prior art technology requires installation of directional antennas to minimize the overlap into neighboring territory in order to resolve a border issue. Since these antenna patterns cannot be made to follow curved geographic borders, sectors are installed and directed for the best geographic coverage possible. This often involves obtaining a cell site location close to the border and "shooting back" toward the wireless communication system's own territory. This can leave null zones where cells back onto each other in an effort to keep signals from overlapping into neighboring territory. These null zones will have either poor quality service or even no service at all, thereby resulting in poor service. Therefore, there is a need to overcome this problem as well.

FIGS. 5A and 5B illustrate a problem of how geographic terrain can affect prior art systems. In FIGS. 5A and 5B, a small rural network A is located just across the river from a large city C, which is part of a neighboring network B. The river defines the geographic and legal border between these two systems. The city C is in another state just across the river. In some river towns, there is a bluff on each side of the river. The network A can place their cell sites very near the border atop the bluff providing overlapping coverage into the city C. Network A will get all the service of the neighboring community D further away from the city C. Network A now has better line of cell site reception into the river valley with its corresponding traffic at river level than does network B who legally "owns" the territory. Network B would have to install additional cell sites in the river valley to obtain the same coverage. Due to the stronger signal level provided by Network A, Network A will process a communications process (CP). The result is that subscriber's Communication Process (CP) may not be processed by the correct service provider.

Note in FIG. 5A that there are two service providers X and Y. The inter-system boundary is shown as a dashed line down the middle of the river. With a bluff on either side of the river, the cells can only service the opposite bluff. This is shown where Y1 cell site cannot "see" the subscriber CD' hidden below. Cell site Y1 can however find CD3 in service provider X's territory. This issue denies revenue to the wireless communication system that has legal right to serve the subscribers within its licensed geographic service boundaries. Prior art systems are incapable of determining the geographic location of both the communications devices and their service boundaries and thus compromise quality of coverage. Therefore, there is a need to resolve this issue.

There is also need for providing a wireless over-the-air communication system with the ability to adjust its coverage and billing as the mobile unit moves. This will permit the system to determine taxes based on where the communication process is actually being made as opposed to the criteria used with the prior art. Still further, there is a need to permit a wireless over-the-air communication system to change frequencies as the mobile unit moves whereby a single wireless service provider can provide service to its subscribers regardless of frequency.

Still further, due to various business reasons, a single cell site may advantageously be used by more than one system. It will be necessary to determine which wireless communication system bills the communication process. Prior art systems cannot fully account for this.

Still further, if there is a service problem with a mobile unit, prior art systems are not able to accurately identify the exact geographic location of the unit when the problem arose. This makes it difficult for the network to pinpoint coverage problems. Therefore, there is a need for a wireless over-the-air communication system that permits a wireless communication system to exactly and precisely identify the exact geographic location of a mobile unit when a communication problem occurs.

Still further, with the advent of emergency response networks that use telephones, such as the E-911 systems, there is a need for a wireless over-the-air communication system that can precisely locate a mobile unit and pass that information on to an emergency response system.

The location of an over-the-air system mobile unit making a communication process can also be of use to law enforcement agencies. However, signal strength from one cell site does not provide such location information with sufficient accuracy to be of the best assistance to law enforcement agencies. Therefore, there is a need for an over-the-air communications network that can provide geographic location of a mobile unit during a communication process with accuracy sufficient to satisfy law enforcement agencies. This information should be rapidly updatable so a mobile unit can be tracked.

Since the CMR industry is growing rapidly, competition is growing. Therefore, it is in the best interest of a system to be able to provide the best service possible to its subscribers. One way of achieving this objective is to customize the service to the exact needs of each subscriber. This can be achieved by, among other things, customizing and varying a billing rate plan for each subscriber. That is, the subscriber may be able to pay a lower rate when he is at work than he pays when he or she is at home. Therefore, there is need to a wireless over-the-air communication system that can vary rate plans and vary rates in a manner that will permit offering the best rate plan to each subscriber based on that particular subscriber's use and needs. Still further, some communication processes must be handled in a special manner to account for environmental conditions, or system needs, such as down time for a specific cell. Therefore, even if a communication process should be handled by a certain cell site, there may be times when that communication process must be handled by another cell site. Therefore, there is need for a wireless over-the-air communication system that can account for special circumstances associated with a communication process, and alter the system response when the mobile unit meets the criteria for those circumstances, even if the communication process is already in progress when the criteria are met.

SUMMARY OF THE INVENTION

It is a main object of the present invention to provide a wireless over-the-air communications system that will permit a wireless communication system to determine the most efficient and accurate service to a mobile unit.

It is another object of the present invention to provide a wireless over-the-air communications system that will permit a wireless communication system to accurately bill a subscriber.

It is another object of the present invention to provide a wireless over-the-air communications system that will permit a wireless communication system to accurately determine taxes for a subscriber for that subscriber's use of the system.

It is another object of the present invention to provide a wireless over-the-air communications system that will be able to handle all communication processes legally permitted it.

It is another object of the present invention to provide a wireless over-the-air communications system that will be able to handle all communication processes legally permitted it and to forward communication processes that rightfully belong to another wireless communication system while retaining billing and taxing of any portion of the communication process that belongs to it.

It is another object of the present invention to provide a wireless over-the-air communications system that will be able to handle all communication processes legally permitted it based on geographic constraints.

It is another object of the present invention to provide a wireless over-the-air communications system that can bill a subscriber based on the geographic location of communication process origination, and then can update and alter that billing as the mobile unit moves.

It is another object of the present invention to provide a wireless over-the-air communications system that can co-operate with other wireless networks in handling a communication process.

It is another object of the present invention to provide a wireless over-the-air communications system that can share cell sites with other networks while retaining its ability to bill and service its own subscribers.

It is another object of the present invention to provide a wireless over-the-air communications system that can provide the most efficient and effective service to its subscribers and users.

It is another object of the present invention to provide a wireless over-the-air communications system that can update any communication process management parameter to account for instantaneous geographic location of a mobile unit.

It is another object of the present invention to provide a wireless over-the-air communications system that can assign and re-assign a communication process according to the location of the mobile unit during the communication process.

It is another object of the present invention to provide a wireless over-the-air communications system that can share geographic boundaries with other wireless over-the-air service providers without border issues.

It is another object of the present invention to provide a wireless over-the-air communications system that can change and update its operating frequencies during a communication process.

It is another object of the present invention to provide a wireless over-the-air communications system which can have the highest possible signal strength at its borders.

It is another object of the present invention to provide a wireless over-the-air communications system which can identify the location of a mobile unit when a service problem arises.

It is another object of the present invention to provide a wireless over-the-air communications system that can efficiently work with emergency service providers.

It is another object of the present invention to provide a wireless over-the-air communications system that can efficiently implement and utilize special rate plans.

It is another object of the present invention to provide a wireless over-the-air communications system that can efficiently implement and utilize special requirements for a communication process.

It is another object of the present invention to provide a wireless over-the-air communications system that can establish parameters for updating mobile unit information based on the particular needs of the mobile unit.

It is another object of the present invention to provide a wireless over-the-air communications system that can establish time and/or distance parameters for updating mobile unit information based on the particular needs of the mobile unit.

SUMMARY OF THE INVENTION

These, and other, objects are achieved by a CMR system that allows the Exact Geographic Location (EGL) of a communications device to be tracked and compared to geographic land data and information data and to continuously update this information during the communication process whereby the proper and most efficient service is provided, including proper communication process management and billing decisions. Within the scope of this invention is the ability to solve the above-mentioned problems and achieve the above-mentioned objects. By knowing the exact geographic location of a mobile unit during a communication process, competing service providers can locate their cell sites anywhere where the wireless reception will allow them to provide the best wireless coverage of their territory. The cell sites can even have overlapping coverage, or be inside an adjacent wireless communication system's coverage area. By knowing the location of the calling device at all times during the communication process, the wireless over-the-air communication system can configure the system to work together with other systems and wireless communication systems to process a communication process correctly. Service can be provided by the proper licensed wireless communication system because the exact location of the mobile unit is known at all times during the communication process. Propagation patterns and the like are not needed.

By way of background, the operation of a cellular system 20 is shown in FIGS. 6, 7 and 7A. The cellular system 20 uses positional data associated with the mobile unit M' to make communication process management decisions. To this end, the cellular system 20, while similar in all other respects to the cellular system illustrated in FIGS. 2 and 3, includes means for accurately and precisely determining the exact position of the mobile unit M', and then further includes means for using this positional information to determine which cell site is best suited to handle a communication process associated with that mobile unit M'.

The means for accurately determining the precise position of the mobile unit includes a Global Positioning System. The GPS includes satellites, such as satellite 22 in geostationary orbit about the earth. Each mobile unit further includes a GPS receiver 24 located between the duplexer and the logic circuitry 25 of the mobile unit. The GPS receiver communicates with the satellite 22 and the exact longitude and latitude of the mobile unit are determined. This information is sent to the MTSO via a cell site, and the MTSO uses a look-up table such as disclosed in FIG. 9, to determine which cell site is most appropriate for use by the mobile unit. The mobile unit communicates with cell sites using unused bits of the aforediscussed overhead messages to send its positional information to the MTSO when the mobile unit is first activated. This positional information is relayed to the MTSO by the first cell site to communicate with the mobile unit. The MTSO then selects the cell site most appropriate for the mobile unit and hands that mobile unit off to that cell site. The cell sites transmit system service boundaries in their overhead messages that are interpreted by mobile units. The mobile units use the location information supplied by the GPS receiver as opposed to signal strength to determine which system to originate on. Communication process termination can utilize the paging process as is currently utilized. A response from a mobile unit includes the location information, and the designated control channel instructs the mobile unit to tune to one of its channels. A communication process in progress utilizes the overhead message of the voice channel to communicate location information. Once a mobile unit that is processing on a particular cell site crosses a cell site boundary, it is instructed to perform a handoff to the cell site that is to service the new location. It is understood that the GPS is used as an example of the preferred source of positional data; however, other sources similar to the GPS can be used without departing from the scope of the present invention. All that is required is that the source of positional data be able to generate precise and accurate locational data on a fixed or a rapidly moving object. It is also helpful, but not absolutely required, that in some circumstances, such as triangulation, the CMR be only passively involved in the determination of the positional data.

The handoff process is similar to the present hand-off processes, except it will be controlled according to position of the mobile unit instead of signal strength. This position information is used to determine communication process rating and taxing for billing purposes and communication process routing to make sure that the proper services for that location are provided.

A "locate request" signal is not used, since the exact location of the mobile unit is known to the MTSO. However, a signal strength method can also be used in making communication process management decisions if suitable. Such a process would be used if the mobile unit moves into a prior art cellular system.

The hereinafter disclosed system has many advantages over the prior art systems. Multiple layers of information can be generated and used. The system using the invention disclosed herein and in the incorporated material may use many levels of mapping such as cell site selection, taxing, billing, special rate plans, and the mapping of E-911 calls to an appropriate service provider.

The above and other objects and advantages of the present invention shall be made apparent from the accompanying drawings and the description thereof.

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

Figure 8:
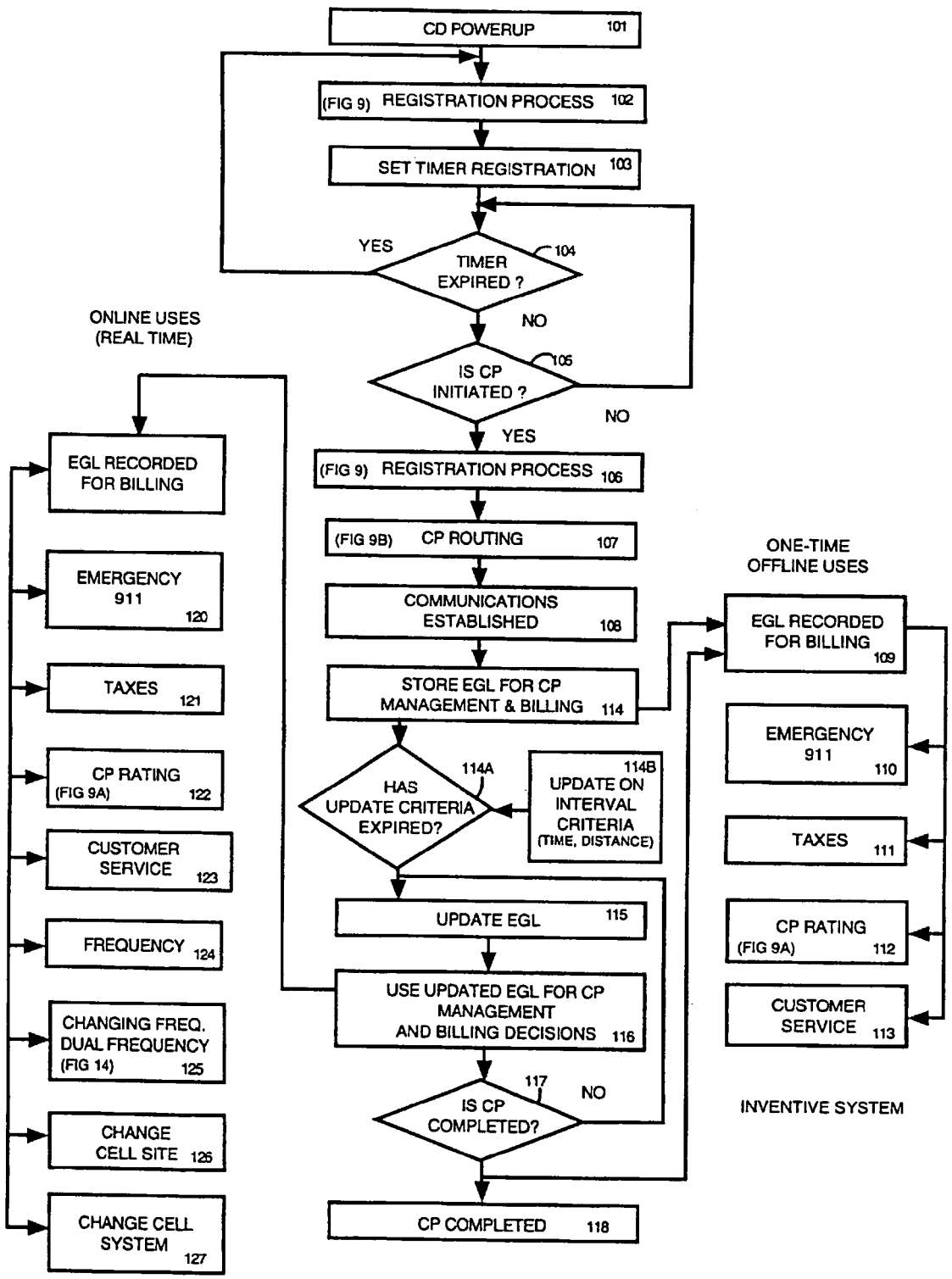
FIG. 8 is a block diagram illustrating a flow chart for the wireless over-the-air communications system embodying the present invention.
Figure 9:
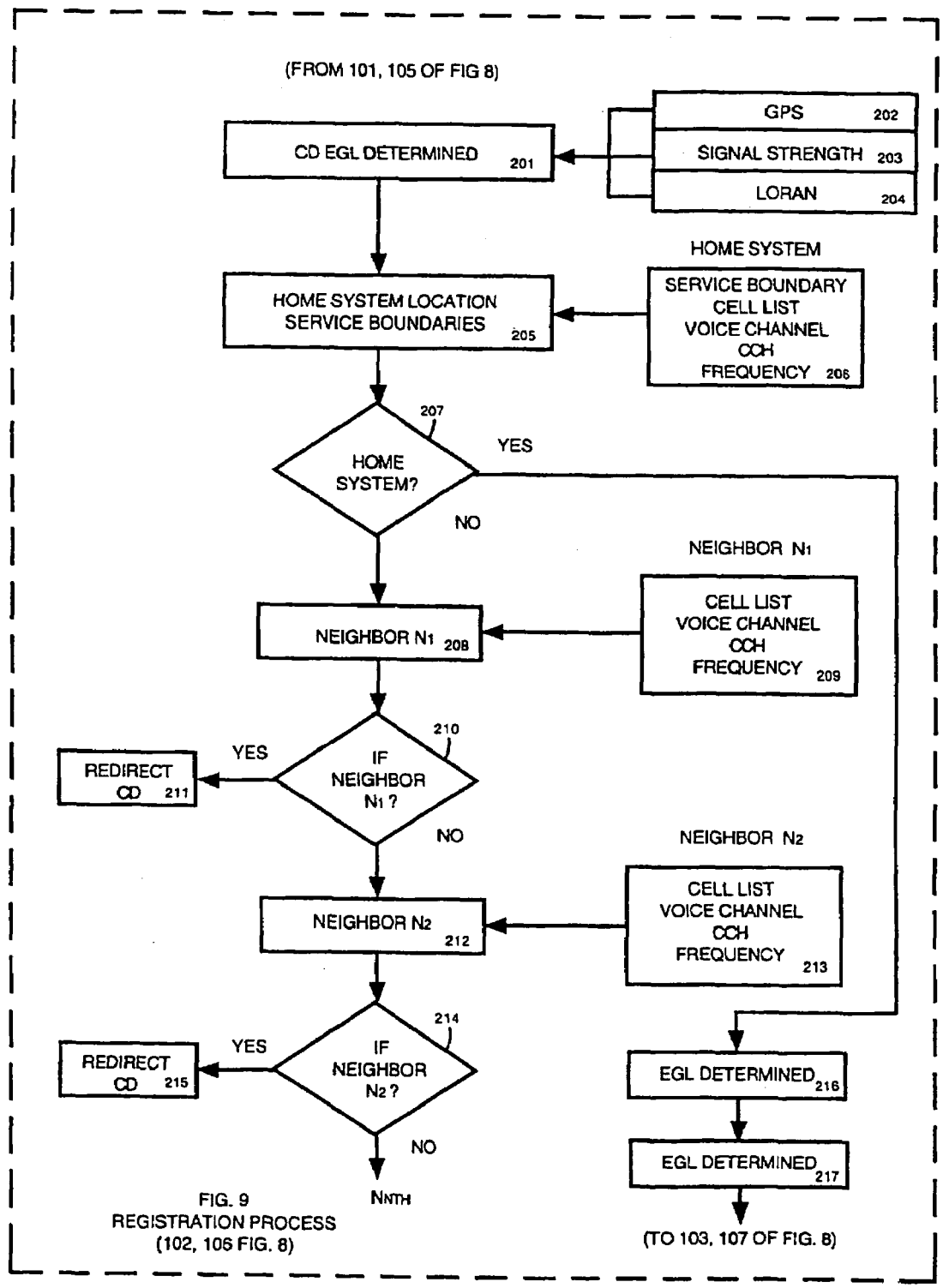
FIG. 9 is a block diagram showing a registration process used in the present invention.
Figure 10:
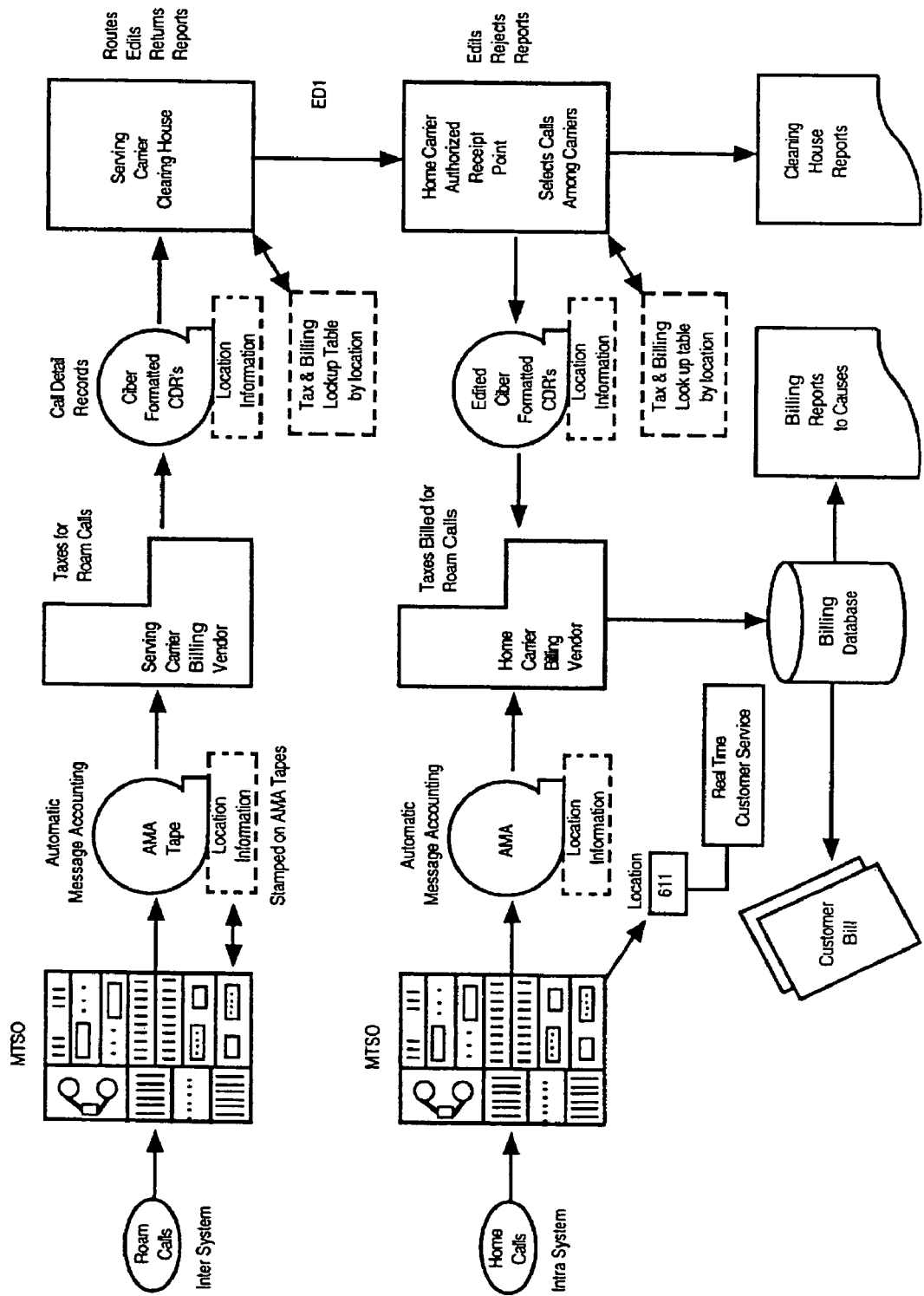
FIG. 10 is a diagram showing a billing process used in the present invention.

A representation of the logical flow that may occur in a wireless communications system incorporating the use of exact geographic location (EGL) for the communication process management decisions is shown in FIGS. 8-10. The communication process management decisions are based on information provided by the communication device (CD) towards the fixed system and to the communications device from the fixed system. The description of a sample communications process (CP) begins upon the powering up of the communicating device and continues until that communications process is completed.

When a communications device is powered up, block 101, the registration process, block 102 is initiated. The registration process is detailed in FIG. 9. The first step in the registration process, block 102 is to determine the exact geographic location, block 201 of the communications device via either GPS, block 202, signal strength, block 203, Loran, block 204, triangulation or other similar location means. The information is used by the initial (Home) serving system and the exact geographic location (EGL) is compared to the service boundaries, block 205 for that home system. A determination is made as to whether or not the Communications Device (CD) is located within the serving system's boundaries via the means of communication data filed in the serving system, block 206. The communication data may include computerized latitude and longitude tables which are then compared to geographic location tables of service allocation. In the absence of comparative tables, algorithms may be run to determine the mapping of exact geographic location (EGL) to service boundaries. If the Communications Device (CD) is located within the serving system's boundaries, the exact geographic location (EGL) is reestablished, block 216 and recorded, block 217 for billing or other purposes if the Communications Device (CD) is determined to be located outside of the serving system's boundaries, then the exact geographic location (EGL) is compared to the neighboring system boundaries, block 208 and block 212 on an interactive basis until the system that is authorized to serve the Communications Device (CD) at the current exact geographic location (EGL) is determined. In addition to the reference tables that assign the service provider, the communication data, blocks 209, 213 also identifies the means of transferring control of the Communications Device (CD) from one system to another. Once the correct system is identified, the Communications Device (CD) is commanded to establish communications with the proper cell site within the correct system 211, 215. An example of this would be commanding the Communications Device (CD) to tune to the neighboring system's control channel. A registration increment timer 103 is then sent to the Communications Device (CD) informing it of the intervals 104 at which re-registration is required. This registration process is continued through the period that the Communications Device (CD) is not in a Communication Process (CP) active state.

Figure 9A:
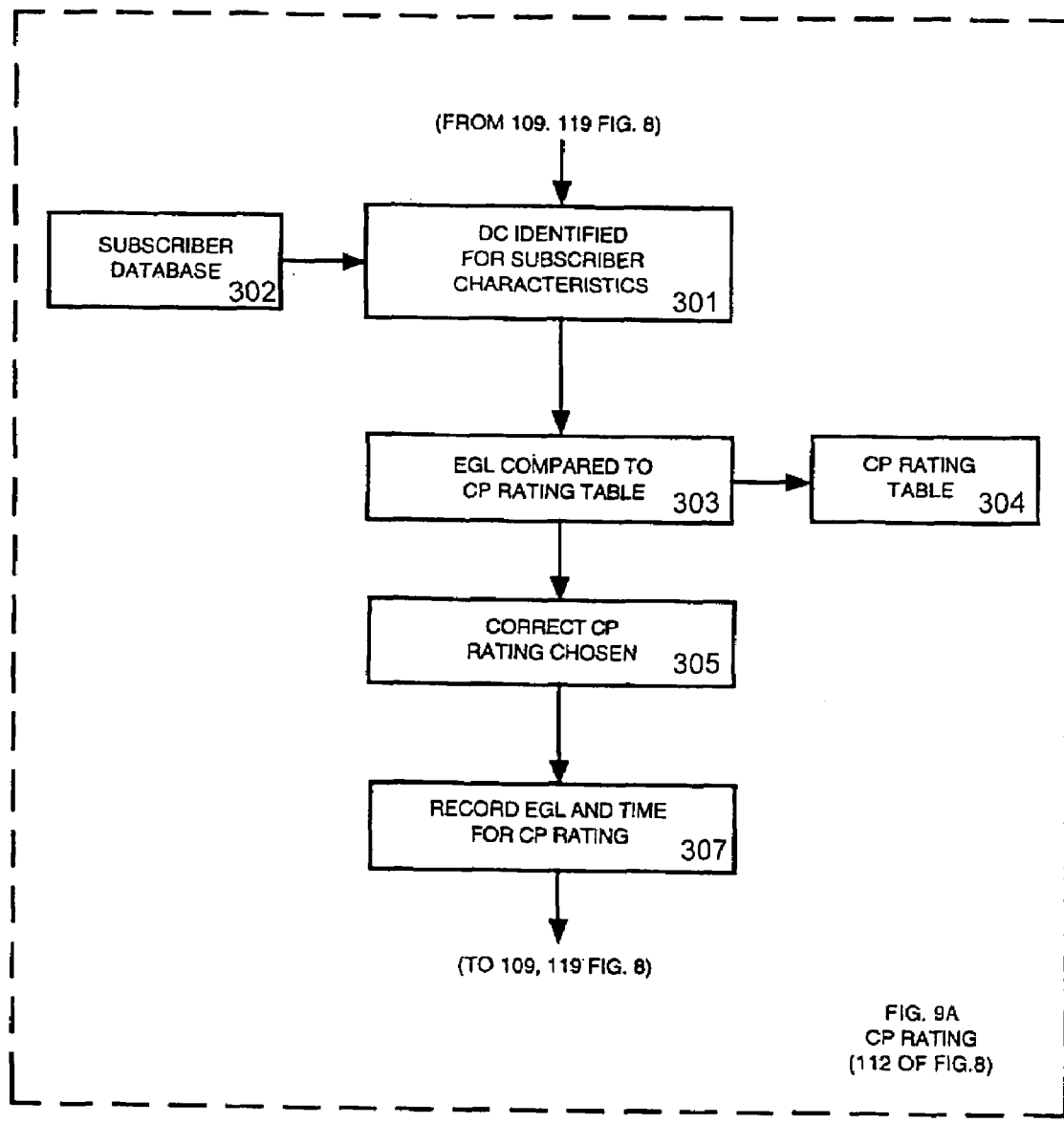
FIG. 9A is a block diagram showing a communication process rating procedure used in the present invention.
Figure 9B:
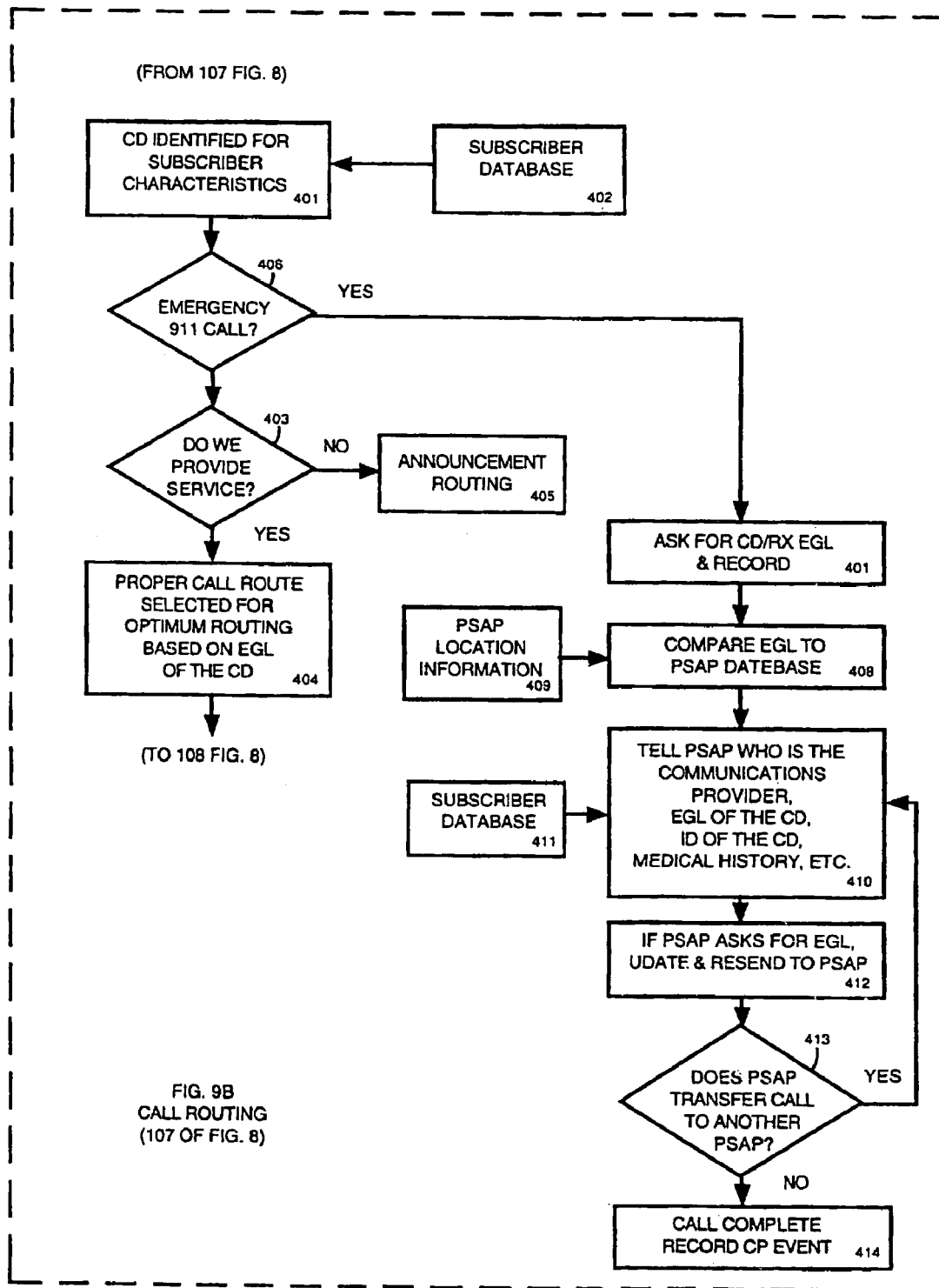
FIG. 9B is a block diagram of a communication process routing process used in the present invention.

If a Communication Process (CP) were initiated then the registration process, block 106, FIG. 9, would take place to update the exact geographic location (EGL). Once the exact geographic location (EGL) is established the routing selection for the Communication Process (CP) is begun, block 107. FIG. 9B shows that the first step is to identify the Communications Device (CD), block 401 so that the service characteristics, block 402 can be identified. A determination is then made as to whether or not service is to be provided, block 403. If service is to be provided proper routing is selected, with the most appropriate communications path to connect point A to point B, selected for the specific communication process based on the exact geographic location (EGL) of the Communications Device (CD), block 404. This may include activities and decision to route communication processes through land based networks, microwave, fiberoptic links and the like to allow for cost effective or expeditious connections to be established. If service is to be denied, the wireless communication system can direct the communication process to the appropriate announcement, block 405 and if the Communication Process (CP) being initiated is determined not to be a 911 emergency call, block 406. If a communication process is determined to be a 911 emergency call, then the system identifies the proper routing of the emergency communication process, blocks 407, 408 and 409, and the communication process will be directed to the proper emergency response system. The routing of this emergency call should be accompanied by all of the information that is pertinent and available, blocks 410 and 411. If the exact geographic location (EGL) continues to change, updates should be sent to the serving emergency response system, block 412. If another emergency response system needs to gain control of the call, the system will be able to establish a connection with the new emergency response system, block 413. This event is then recorded upon completion, block 414.

With communications established (FIG. 8), block 108, the exact geographic location (EGL) may be stored for Communication Process (CP) management, billing purposes, and other identification needs, block 114. The stored exact geographic location (EGL) is then recorded for establishing the origination point for billing purposes, block 109, emergency 911 call accounting, block 110, taxing purposes, block 111, rating the Communication Process (CP), block 112, or post communication process subscriber service, block 113. The Communication Process (CP) rating process shown in FIG. 9A identifies the subscriber characteristics, blocks 301 and 302. The recorded exact geographic location (EGL) is then compared to the Communication Process (CP) rating table, blocks 303 and 304 to select the correct rating, block 305 for that communication process (CP). This information is then recorded for later processing which may include application of taxes, Communication Process (CP) billing rates, or any other information which could be matched to the exact geographic location (EGL) of the communication process (CP). As the Communication Process (CP) continues, the exact geographic location (EGL) is constantly updated, block 115 or alternately updated at various intervals, block 114a, which intervals can be changed based on the time and/or distance traveled by the mobile unit to meet system needs for efficient communication process management, and these updated Communications Device (CD) locations are used for communication Process (CP) management, block 116, billing decisions, block 119, and other real time processing uses, such as 911 emergency calls made while a non-emergency communication process was in progress, block 120, taxing, block 121, Communication Process (CP) rating, block 122, subscriber service, block 123, and frequency selection, block 124. The intervals at which the updating occurs can be determined on a preset time, such as every minute, or can be determined according to distance traveled by the mobile unit, such as every twenty miles, or the interval can be set according to the nearest border so that the mobile unit will be monitored whenever it reaches a location that would cross over the border if the mobile unit traveled toward that border. In this manner, the billing information, the tax information and the frequency of the communication process can be based on the location of the communication process origination, but can also be continuously updated and changed as the mobile unit moves during the communication process whereby the exact rates and frequencies at any instant during the communication process can be applied to the communication process. As was discussed above, this will even permit separate networks to share cell sites as even though a single cell site handles a communication process, the location of the mobile unit will determine which system receives credit for the communication process and will handle the billing and taxing of the communication process. Alternatively, this will permit separate cellular systems to locate their own cell sites within the geographic area of another cellular system, and may even permit several different systems to share a single cell site.

The cell site can re-direct a communication process to another cell site under certain circumstances. For example, even though a particular cell site is chosen to handle a communication process, there may be special circumstances associated with a particular location that dictate all communication processes from that location be handled by a certain cell site. Special environmental conditions may be one such special circumstance, cell sites under repair may be another special circumstance or other business reasons may dictate such re-directing of communication processes. This redirecting can also occur for cellular systems. That is, if a selected cell site is not owned by the cellular system having rights to the communication process made by the mobile unit at that particular location, the communication process could be redirected to another cellular system. In this manner, customization of cellular service can be maximized with billing, taxing, frequency and the like all being selected according to the exact needs of the mobile unit during the communication process, and changed as the needs of the mobile unit change during the communication process. As discussed above, the preferred means for establishing the exact geographic location of the mobile unit includes a satellite communications system; however, other means can also be used.

All of this data collection and monitoring continues until the Communication Process (CP) is completed, block 117. When the Communication Process (CP) is complete, and exact geographic location (EGL) of the mobile unit is recorded for various data processing uses prior to the data record closure, block 118.

FIG. 10 shows how the billing information is passed along through an external billing system. The MTSO first generates Automatic Message Accounting (AMA) files, usually in magnetic tape format, which holds all the detailed records for communication processes processed from a particular MTSO during that billing period. The AMA records are then processed (formatted into database readable media) at the wireless communication system's billing center which emerge as Call Detail Records (CDR). Call Detail Records are the detailed accounting of all the communication processes assigned to a subscriber's account. The roaming and home reports are combined which are then processed as subscriber bills. It is here in the prior art system that any taxes may be applied by the service provider or by the wireless communication system. Ideally, taxes should be assessed based on the location of the mobile unit when service is provided. This is not the case with prior art systems. For example, home communication processes are taxed according to either the billing address of the subscriber or the zip code or business address of the service provider and roam communication processes, that is communication processes made using a cell site that is not in the mobile unit's home area, are taxed based on the billing address of the roam network or where the cell site is located that services the communication process. Any tax based on the cell site location has the possibility of being in error, especially if the cell site is located adjacent to a border. The prior art has failed to teach the distinction between fixed location of hardware and exact geographic location (EGL) of the Communications Device (CD) for billing.

In the present system, the wireless communication system will obtain the instant location of the Communications Device (CD) at the registration process (FIG. 9). In a system where bills are processed externally, billing information combined with the location of on the Call Detail Records can then be compared to lookup tables or algorithms that will assess the proper tax or billing rate depending on the location (origination, termination, duration, instantaneous location, or the like) of the communication process.

If needed, the billing location codes could be recorded at some given interval (perhaps, for example, every minute, or after the mobile unit has traveled a certain distance) that would allow for updates and changes to the billing code as the Communications Device (CD) moves through different territories or beyond interval distances which can be calculated directly in a GPS system or indirectly via vector calculations in other systems.

One of the additional features that can be provided by the system of the present invention is real time subscriber service (FIG. 8, block 123). Knowing the location of the Communications Device (CD) is important to the wireless service provider to help solve some service problems associated with the wireless network.

Figure 17:
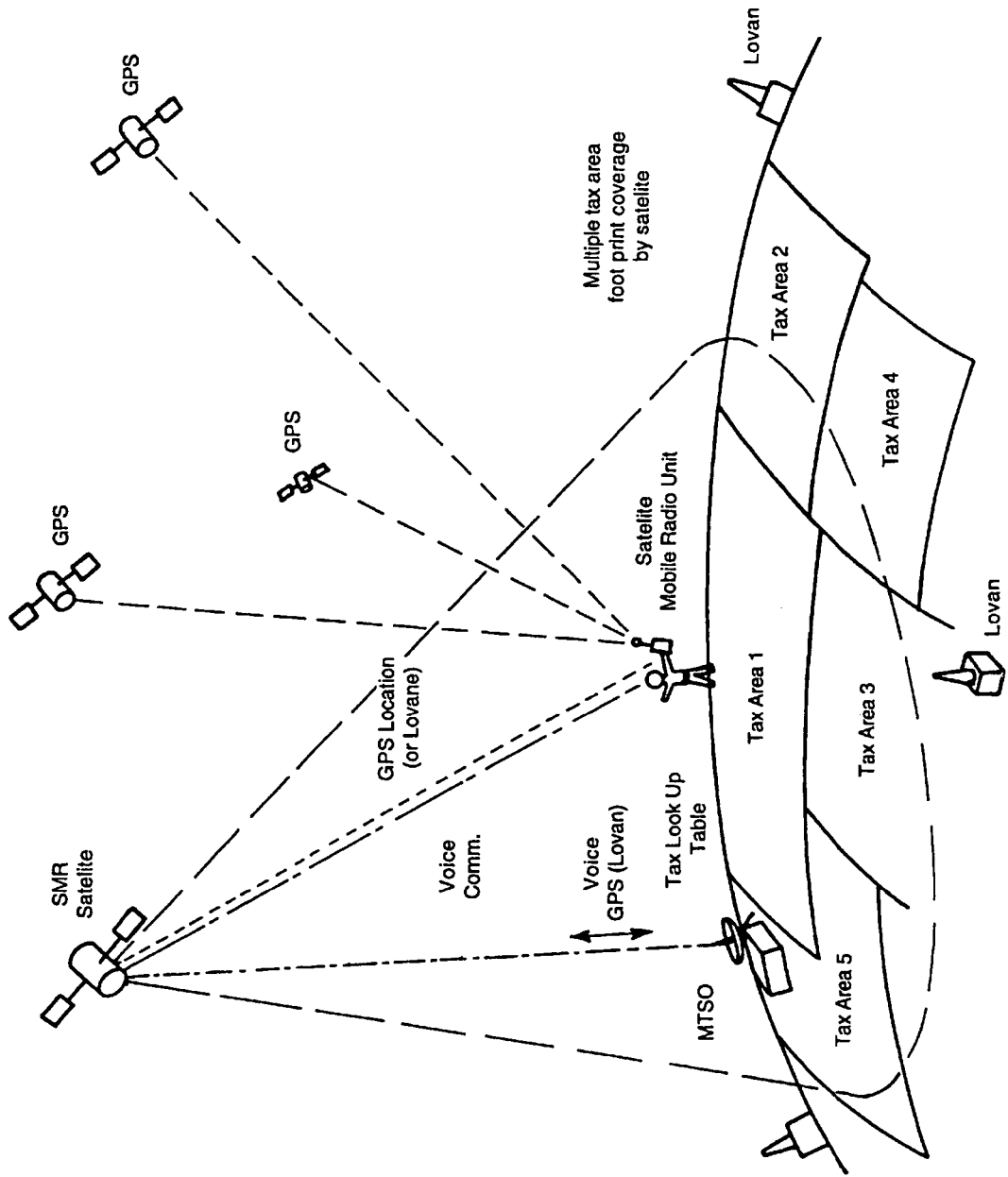
FIG. 17 illustrates the application of the present invention to a geographic area which includes several countries.

Although billing and taxing issues are important to current land based wireless communications systems service providers, these issues will be even more important for satellite systems (see FIG. 17) because the footprint of a satellite can cover many states or even different small countries such as in the European Community, with enormous tax generating capacity. With GPS location devices or Loran-C or any other type of location technology used to locate the satellite mobile phones, the problem can be avoided using the system disclosed herein. The exact geographic location of each subscriber unit will be carried along with voice transmission to allow location of the billing unit to be determined for tax assessment billing.

The advantages realized by the present invention can also be understood by comparing FIGS. 3-5 to FIGS. 11-16.

Figure 4:
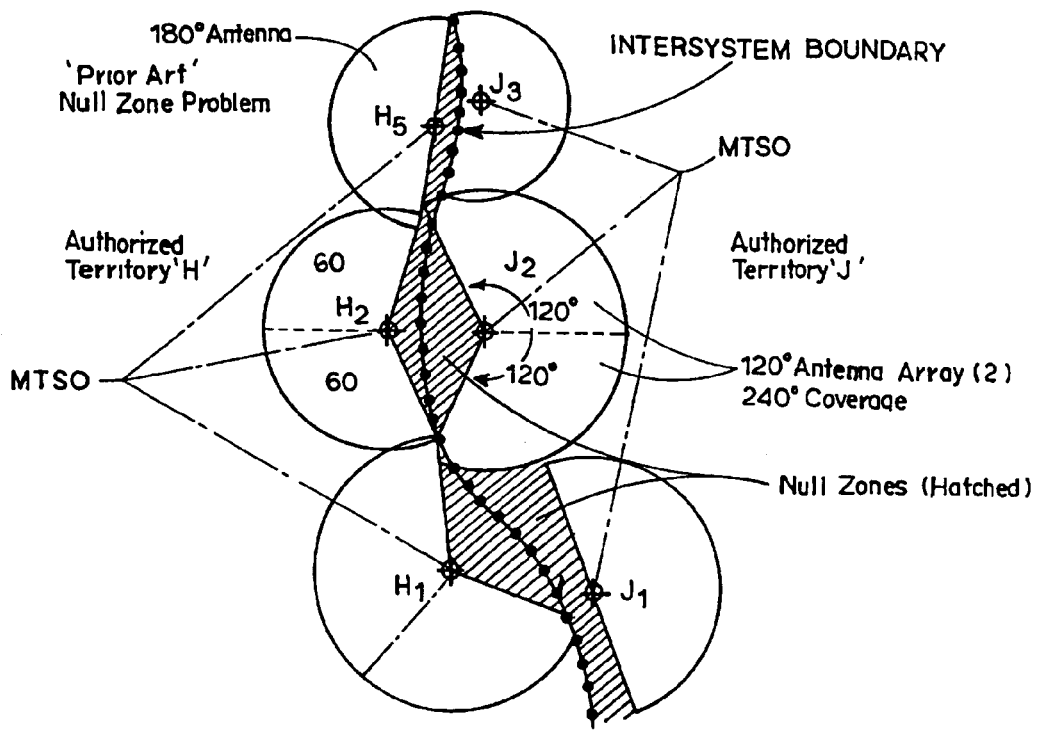
FIG. 4 illustrates a null zone problem associated with prior art systems.
Figure 5A:
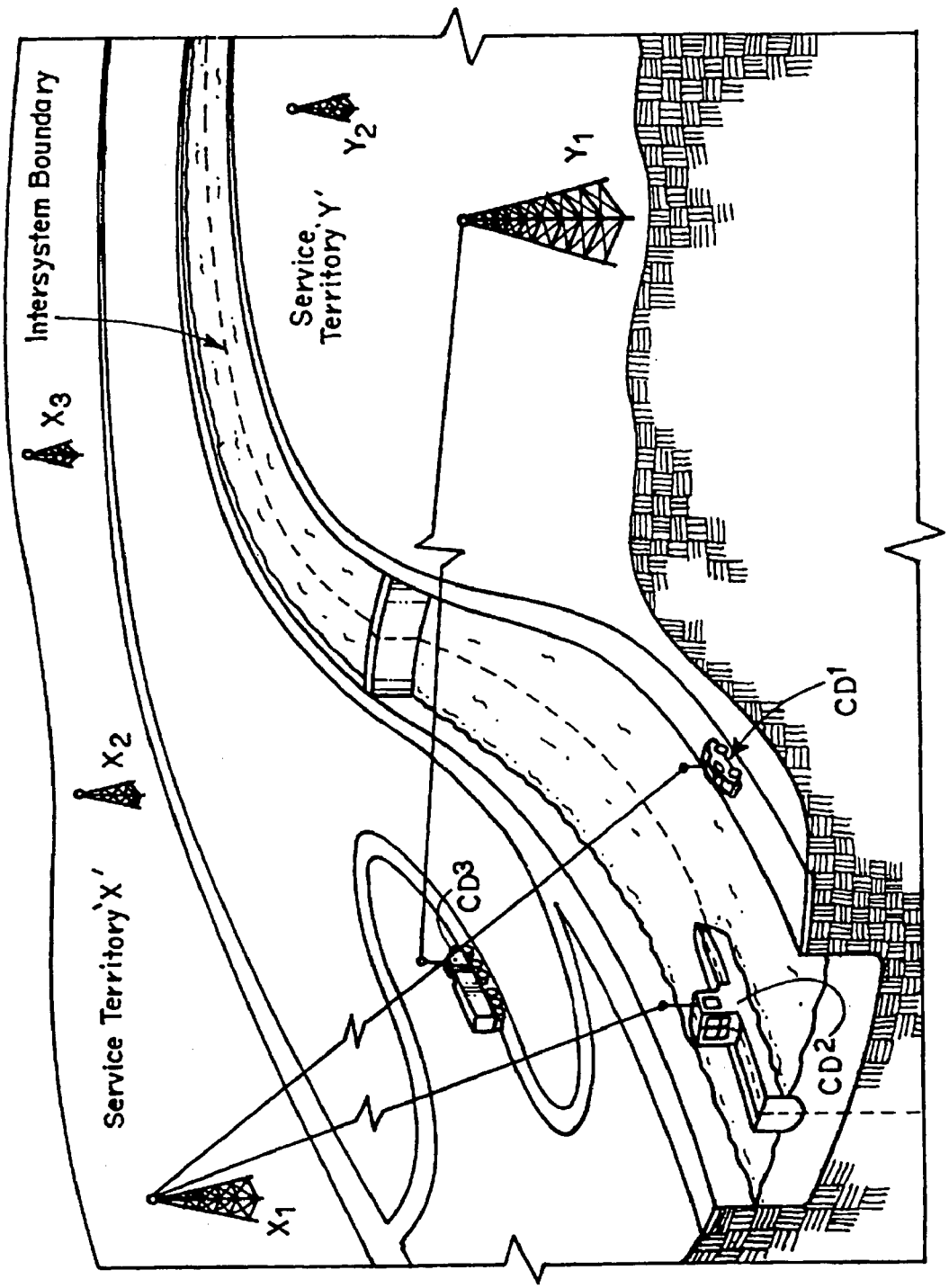
FIGS. 5A and 5B illustrate boundary issue problems between two prior art systems separated by a natural boundary, such as a river.
Figure 5B:
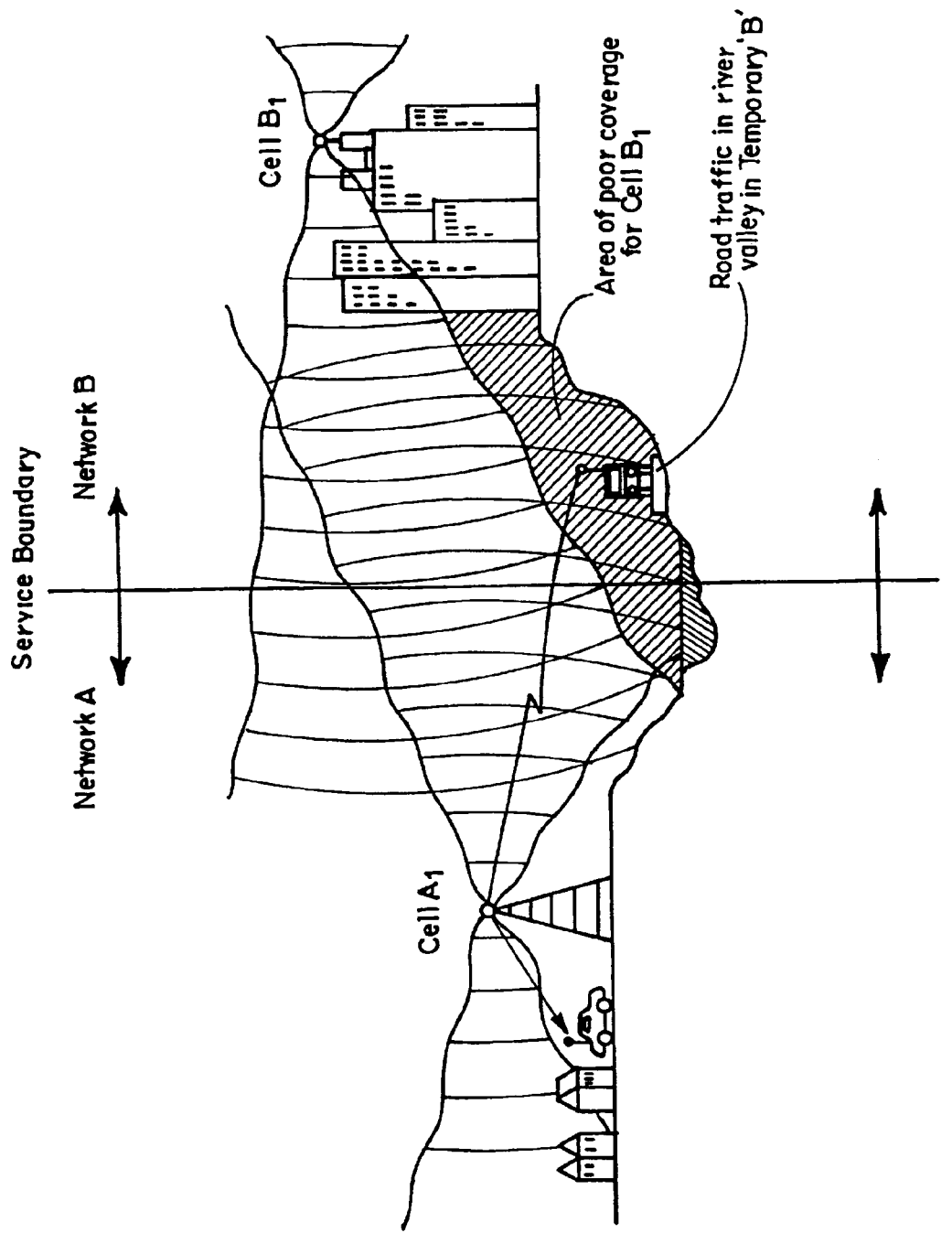
Figure 6:
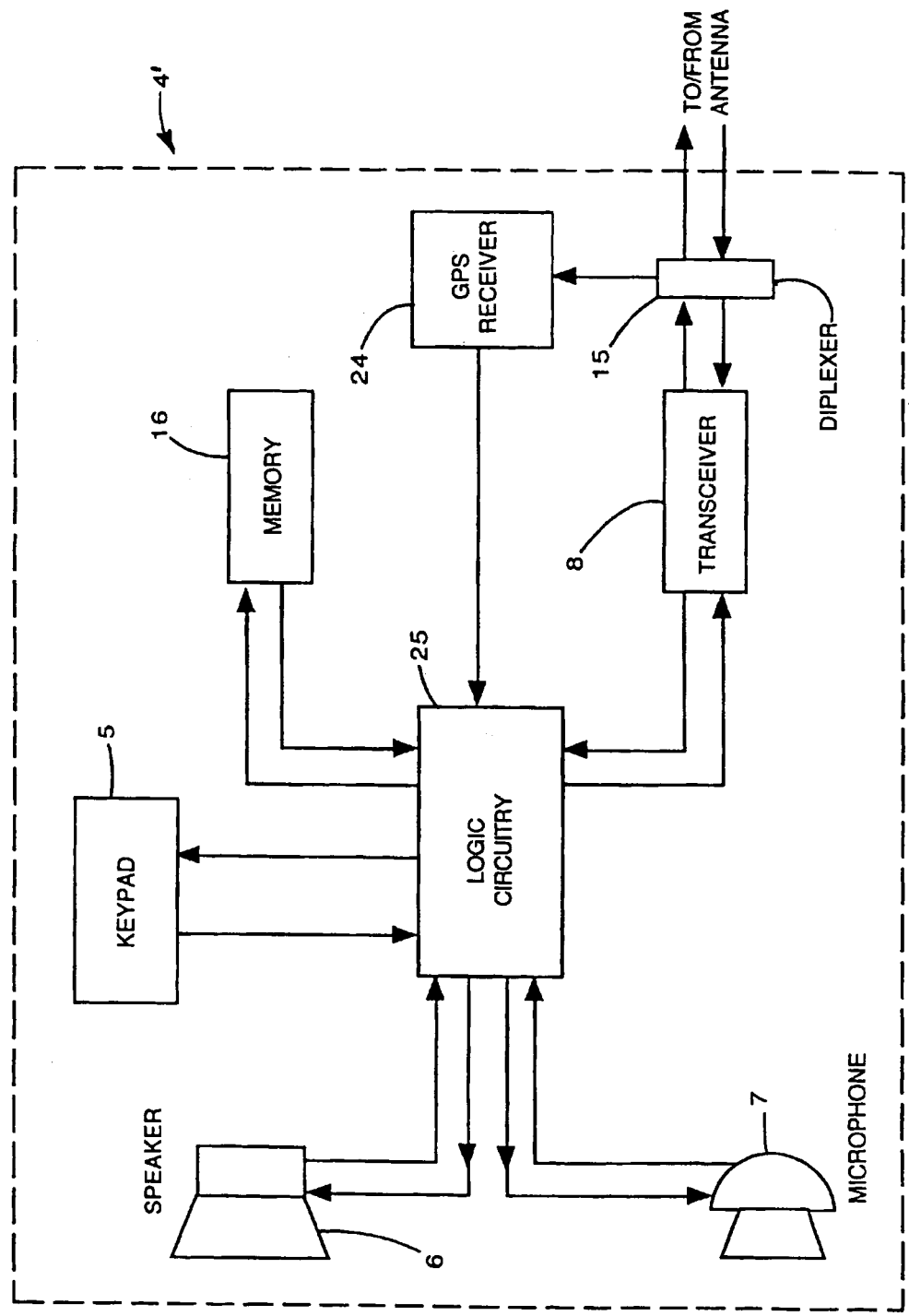
FIG. 6 is a block diagram of a mobile unit of a wireless over-the-air communications system which incorporates a GPS location determining system embodying the present invention.
Figure 7:
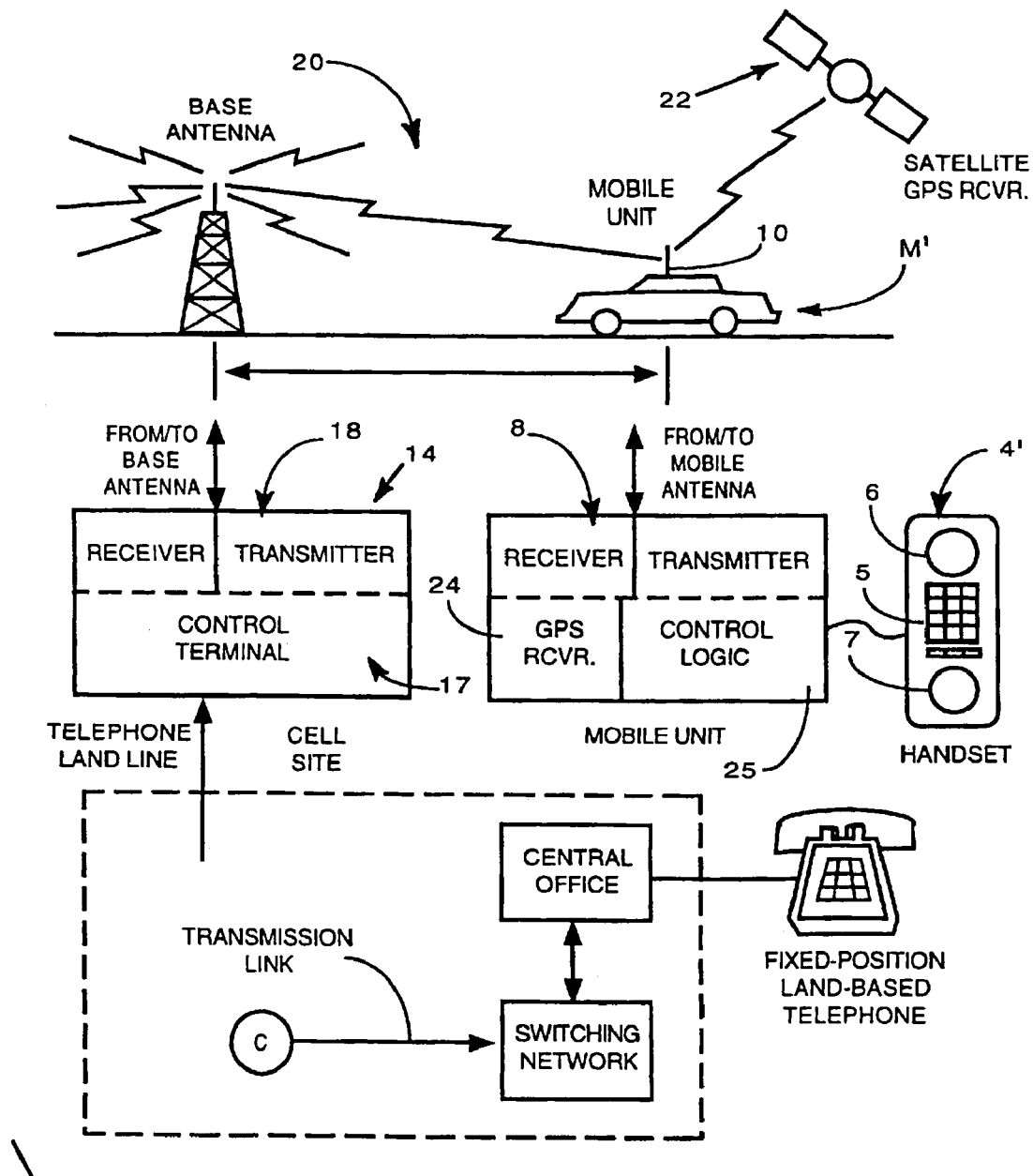
FIG. 7 illustrates a wireless over-the-air communications system incorporating a GPS position locating system for a mobile unit communicating with other units, such as the fixed-position unit shown.
Figure 7A:
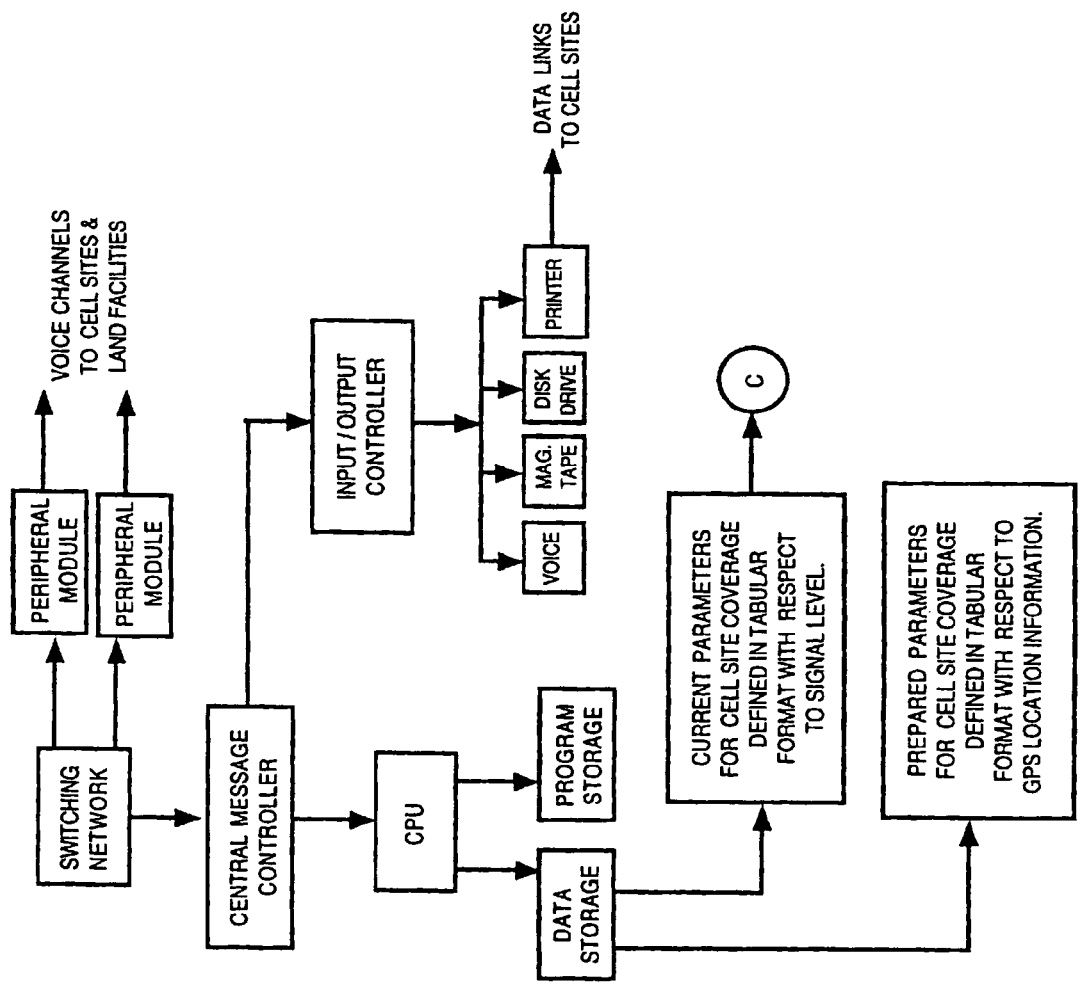
FIG. 7A is a block diagram showing systems included in an MTSO.
Figure 11:
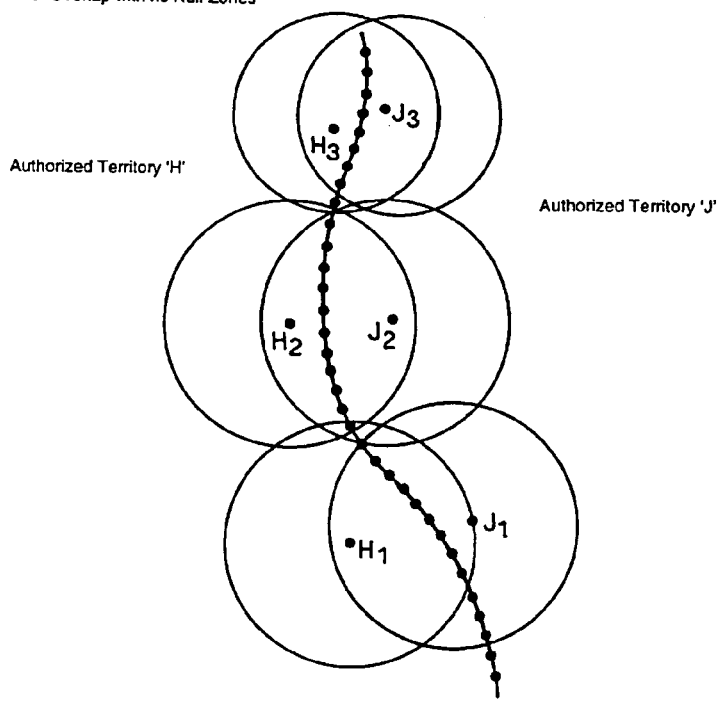
FIG. 11 illustrates the elimination of a null zone problem with a system embodying the present invention.

FIG. 11 shows the identical borders and cells as shown in FIG. 4. However, this time omnidirectional antennas are shown which improve coverage but can cause overlap into a neighboring system. This overlap can be handled as described above by each network having independent inter-system cells which map the exact geographic location (EGL) of the Communications Device (CD) to determine which system will service the CP.

Figure 13:
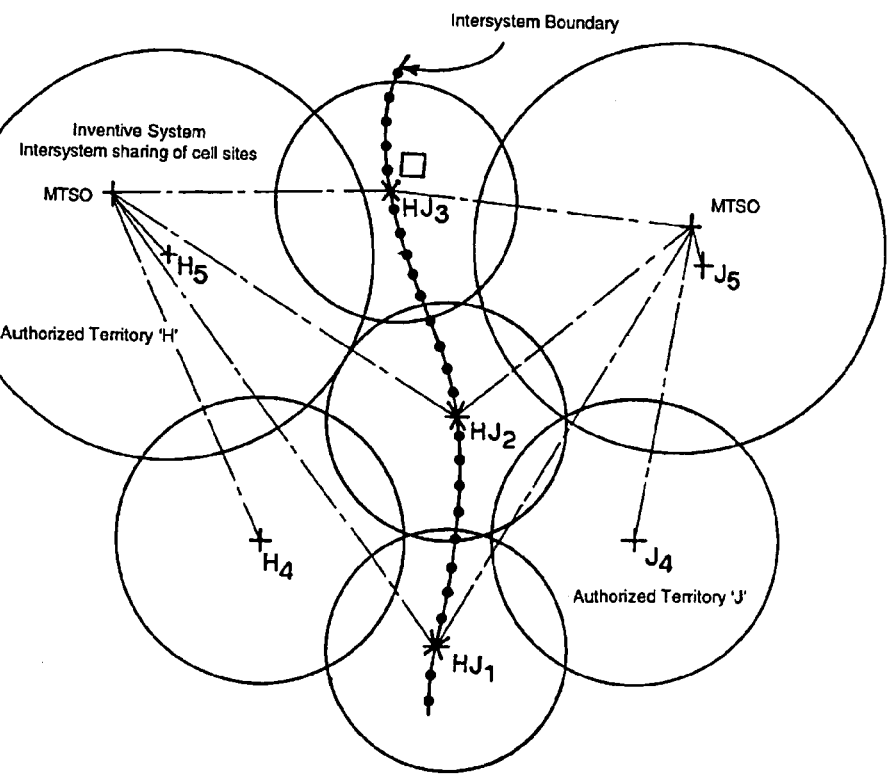
FIG. 13 illustrates how cell sites can be shared using the system of the present invention.
Figure 12:
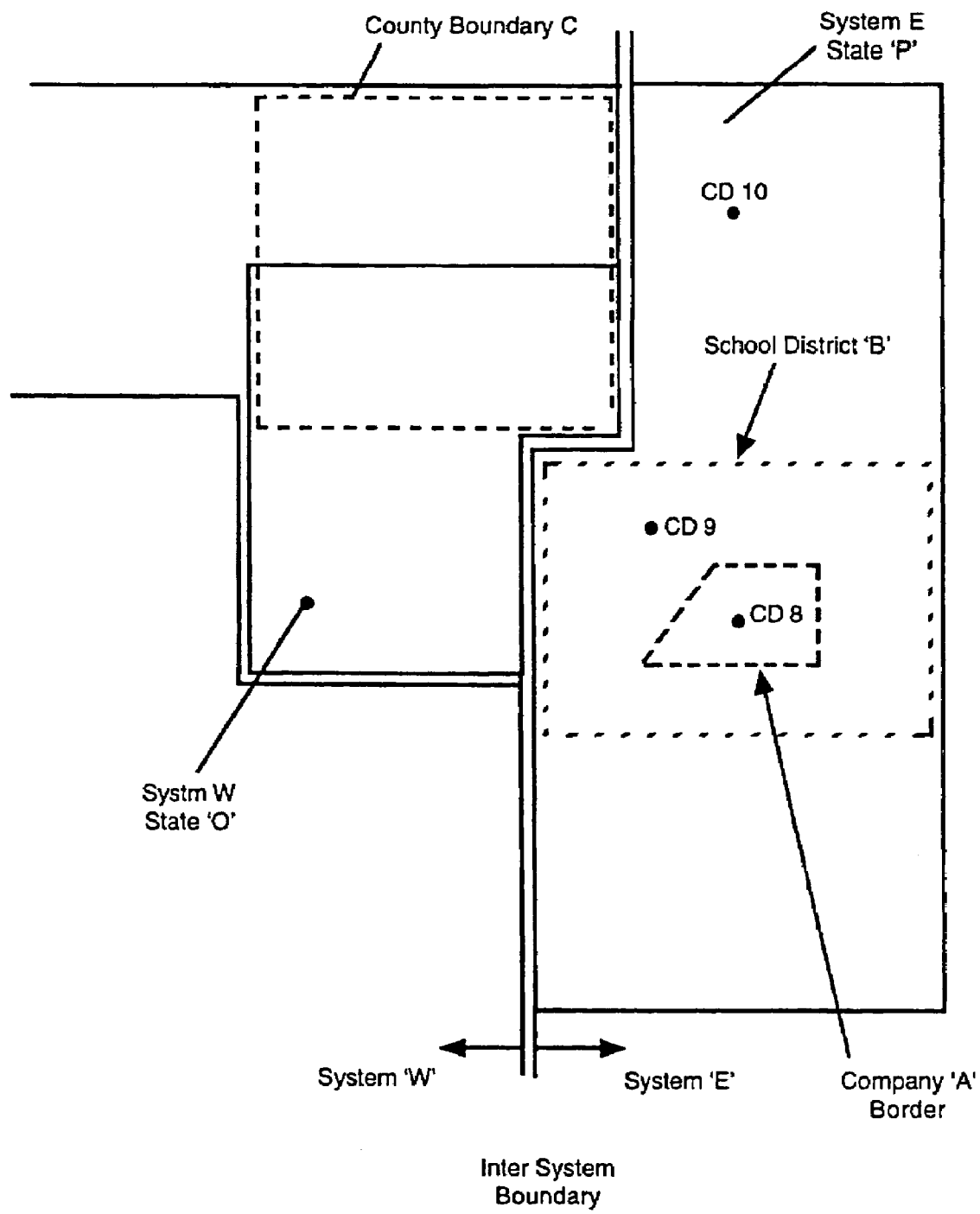
FIG. 12 illustrates variable billing and/or taxing for a mobile unit using the system of the present invention.

FIG. 13 shows still another configuration which could be utilized where borders are concerned. Two or more bordering service providers could erect single cells on or very near the border. Since the systems will track the exact geographic location (EGL) of each communications device (CD), it will know which service provider to connect the Communication Process (CP) to. This system uses a routing processor after the Communication Process (CP) has been accepted.

Figure 14:
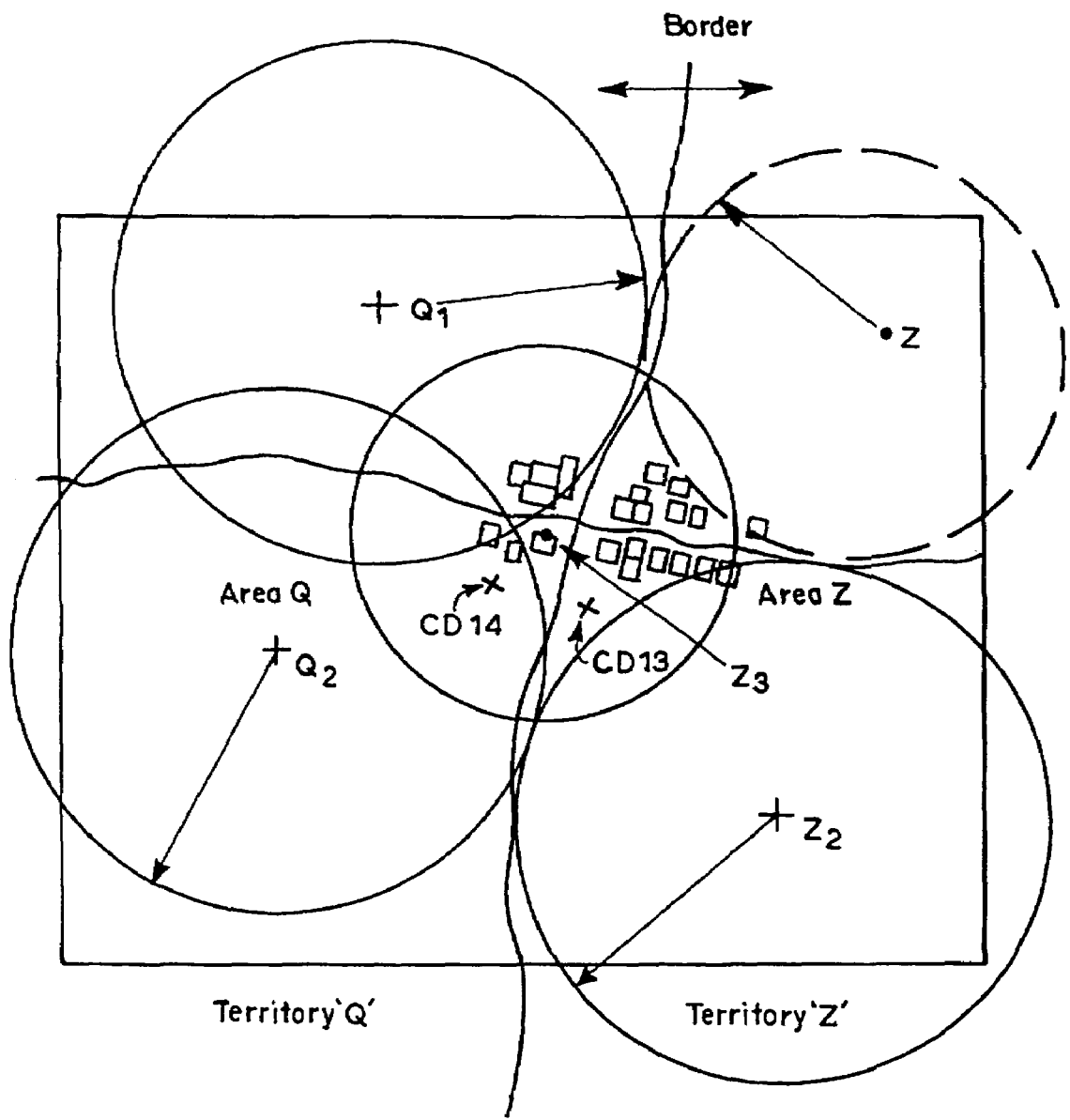
FIG. 14 illustrates how a cell site for one wireless over-the-air communication system can be located in the geographic boundary of another wireless communication system when the present invention is used to manage communication processes made by a mobile unit.

FIG. 14 shows a situation where the cell site from a competitive service provider is inside their borders. As shown, cell site Z3 is in place in service provider Q's territory. Communications Devices which are physically located inside territory Z which come up on cell site Z3 (communication device CD13) will be accepted. Communication device CD14 which will come up on cell site Z3 will be redirected to the control channel of cell site Q2 since it lies within territory Q.

Figure 1:
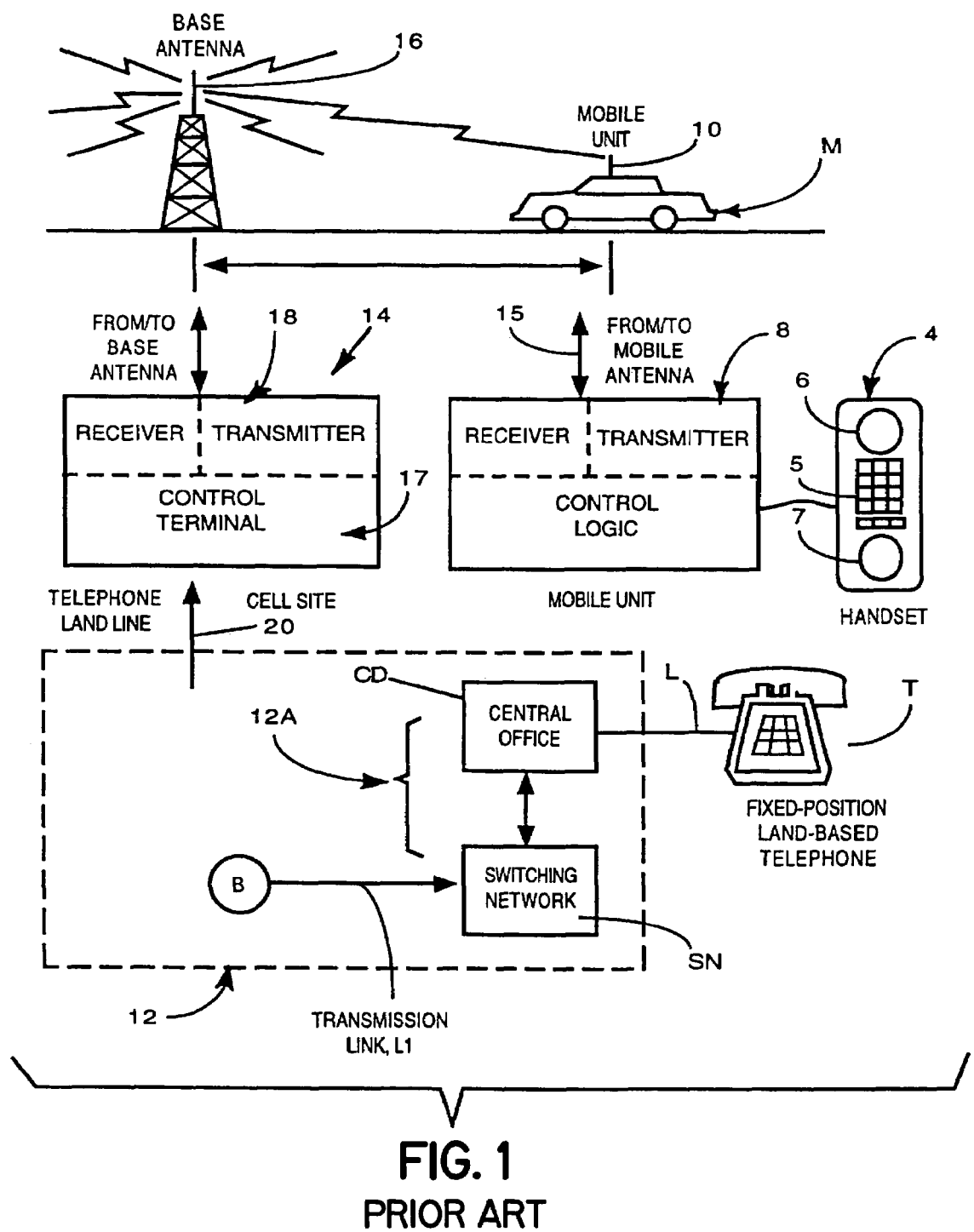
FIG. 1 illustrates a typical prior art mobile cellular telephone and its link with a fixed cell site and an MTSO.
Figure 2:
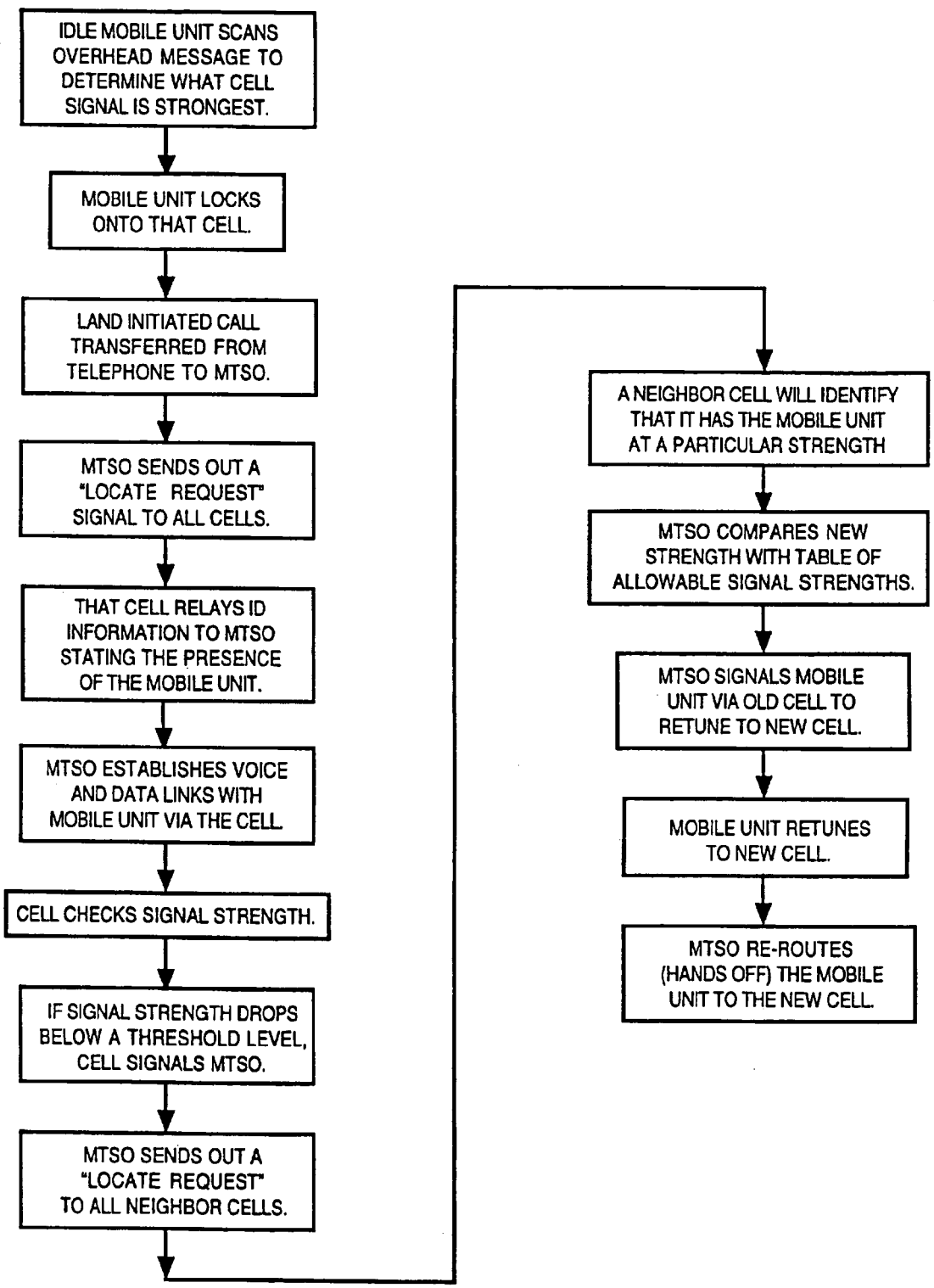
FIG. 2 illustrates a typical prior art cellular system in which a mobile unit can be connected with a fixed-position unit.
Figure 3:
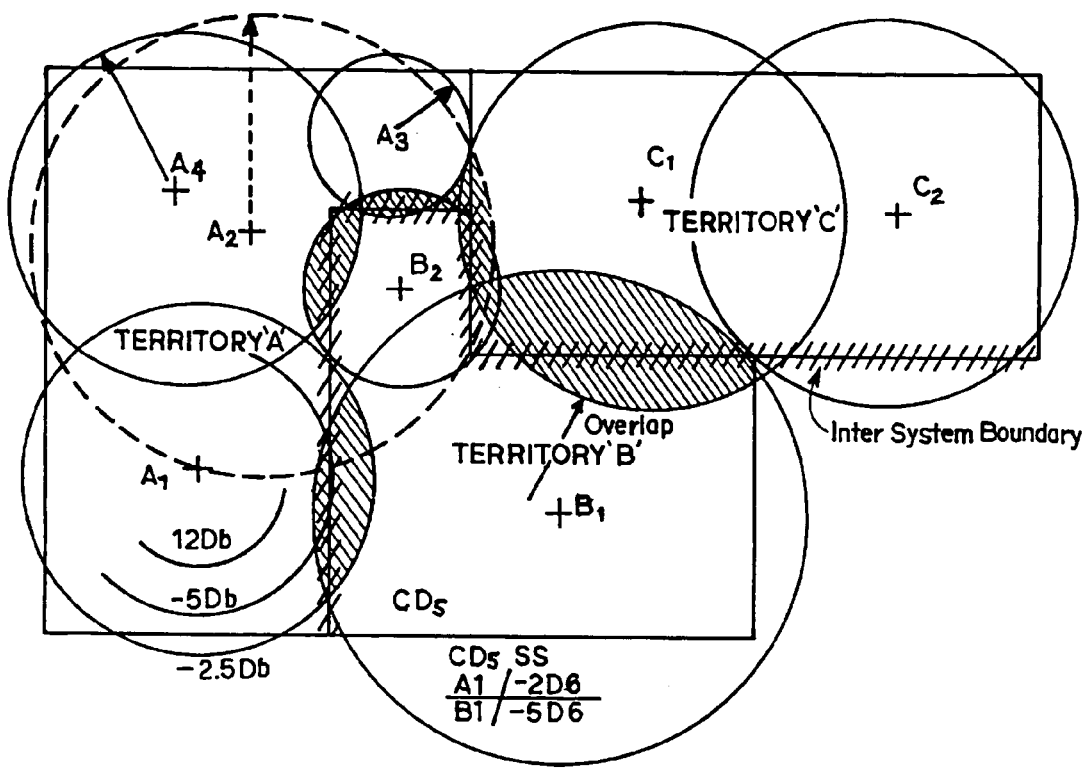
FIG. 3 illustrates an overlapping boundary problem with prior art systems as well as a fading signal at the borders.
Figure 15:
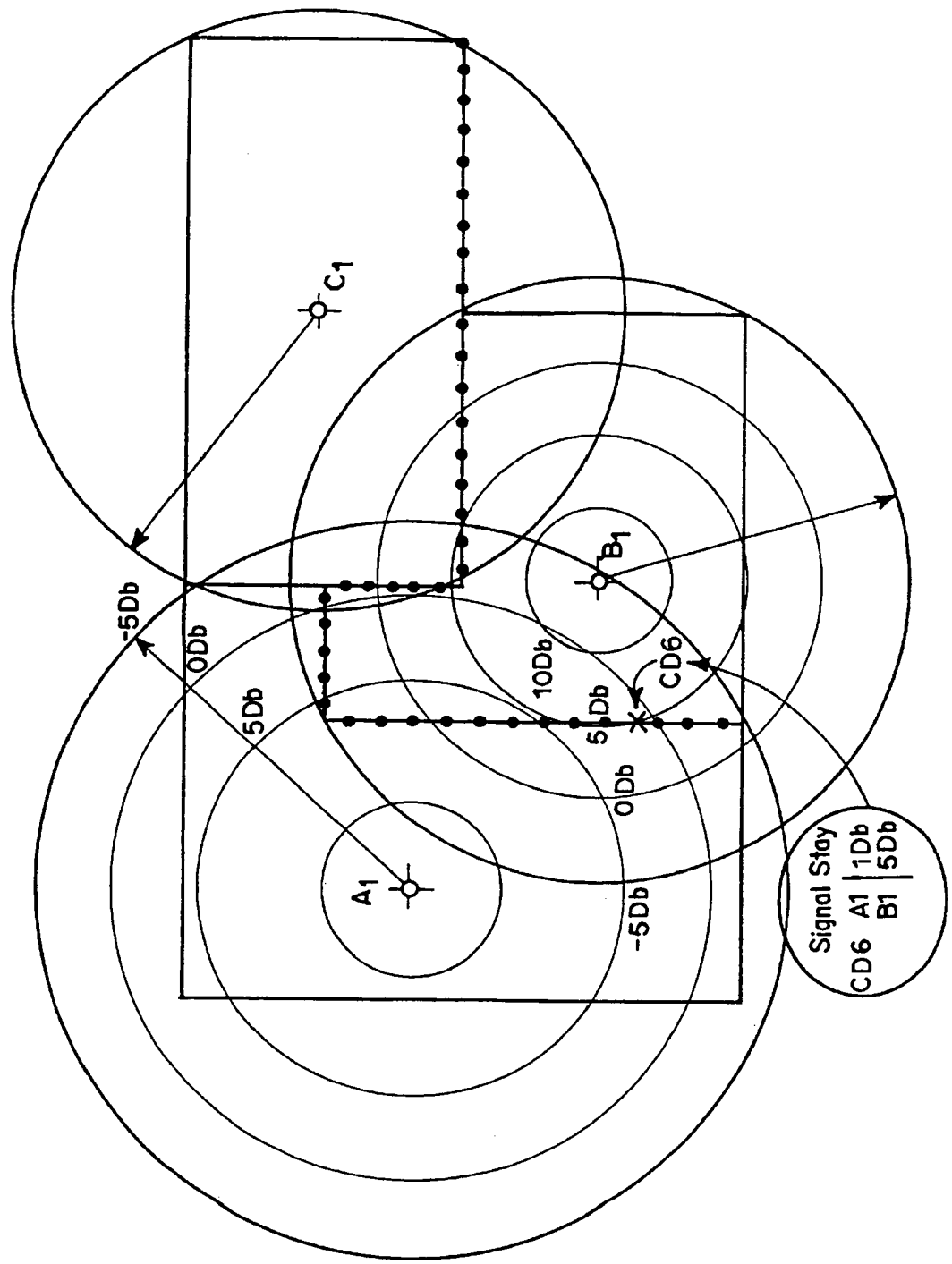
FIG. 15 illustrates the solution to overlapping boundary problems achieved by the present invention.

FIG. 15 shows the same territory depicted in FIG. 3 which in the prior art had many cells and many border overlap issues, which resulted, in prior art systems, in the service providers adding smaller cell sites to break up the coverage into smaller cells. FIG. 15 shows what can be done with the inventive system to reduce the number of cell sites. By having fewer cells, they will have to be of higher power which allows for better signal strength out at the borders. By using the inventive system to manage the Communication Process, the correct system will handle communication processes even under conditions of overlapping coverage into a neighbor's territory. To illustrate this, the signal values are shown in FIGS. 3 and 15 for cell site coverage of cell sites A1 and B1. In the prior art system (FIG. 3), each service provider will adjust its cell site to give some predetermined signal strength at the border. As an example, this value is shown as −5 dB. This value will be as close to the border as possible to invoke a hand-off to the neighboring service provider (Note, communication device CD5 is at signal strength levels, A1=−2 dB, B1=−5 dB). However, the weaker the signal, the poorer the service such as terminated communication processes. However, if a contrast is made with the signal strengths in the inventive system, it will be found that higher values at the borders can be maintained which results in better service. For example, communication device CD6 signal strength A1=1 dB, B1=5 dB. Since most borders are straight lines and wireless communication sometimes propagates in a radial fashion, prior art service providers cannot simply increase the cell site's power to provide higher signal strength values at the borders. Therefore, if a provider sets a cell site to hand off at a certain value, it will hand-off wherever the signal strength decreases to that level, which may be a radial curve, which most times may not follow the geographic service boundaries.

Therefore, as can be seen from the figures, if the provider were to increase the signal strength in an area, it may result in more overlap. This overlap is not a problem with the inventive system since the service boundaries are mapped to the exact geographic location (EGL) of the communications device (CD).

Figure 16:
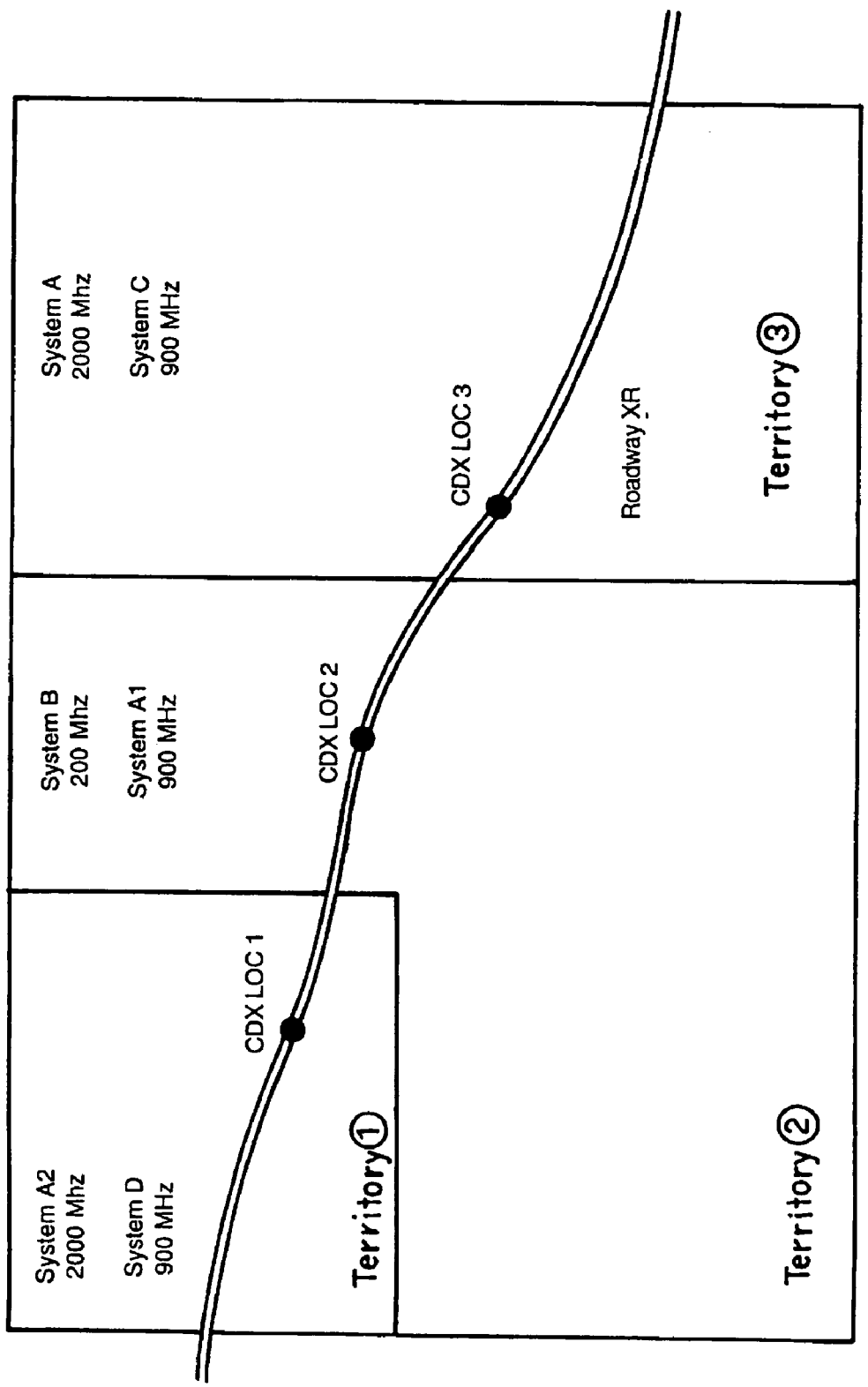
FIG. 16 illustrates how frequency of a communication process can be changed using the system of the present invention during a communication process and without the unit being aware that the frequency is being changed.

An example of another advantage realized with the present system is that all communication processes may be processed through the tax data base, but the wireless communication system may have a select group of subscribers that are identified to pay a certain billing rate in a specified geographic area which would constitute an additional loop through another look-up table. For example, as indicated in FIG. 16, company A has negotiated for an attractive airtime rate within its plant's boundaries. This plant also resides in school district B which has assessed it own tax. The company employees will therefore enjoy the attractive rates while inside the plant and must pay the school tax on those communication processes. But if those employees go beyond the plant, they will lose the lower rate. For instance, communication device CD8 may have a low pre-negotiated rate, but pay school district B and state P taxes. Communication device CD9 pays the school district B and state P taxes, and communication device CD10 pays only the state tax. Billing is continuously updated no matter where the communication process originated as the mobile unit moves.

Still another application for the technology of this invention could encompass the switching of a dual frequency phone to a second frequency based on exact geographic location (EGL) of the communication device (CD). An example of this would be switching from 800-900MHz to 2 GHz frequencies used in the upcoming PCS system. This would be useful for the commuter who wants PCS for his Communications Device (CD) in the city and to be able to roam out of PCS territory into cellular territory. It may even come to the time when subscribers are given rate plans that correspond to different zones, such as a 2000 foot perimeter of their residence which would be billed at a residence rate, and be billed at a Home market rate beyond that. Still further, when the subscriber enters into the geographic zone of his or her employer, the MTSO will forward his business communication processes to his communication device (CD), all based on his present exact geographic location. This could be an important competitive advantage to a service provider that owned the 900 MHz in one area and the 2000 MHz rights in a second area. For example, FIG. 16 shows service provider A, which owns the license to 2000MHz in territory 1, the 900 MHz license in territory 2 and the 2000 MHz license in territory 3. When mobile unit CDX travels on roadway XR, it will pass through all three territories. The service provider would like to handle all the billing revenue for its subscribers traveling through territory 2, but does not have the 2000 MHz license in that area. The communication device CDX is therefore instructed to retune to 900 MHz in territory 2 because System A does have rights to communication processes in territory 2 at the 900 MHz frequency. This allows System A to bypass System B even though the System B is a 2000 MHz service provider adjacent to two System A territories.

The preferred means for establishing exact geographic location (EGL) is a satellite communication system such as discussed in the incorporated material. However, other means, including, but not limited to, triangulation and the like, can be used without departing from the scope of the present invention.

It is understood that while certain forms of the present invention have been illustrated and described herein, it is not to be limited to the specific forms or arrangements of parts described and shown.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A telecommunications system, comprising:
a data storage system for recording a geographic location associated with a mobile unit identification number, and
an updating system responsive to an inaccuracy in the geographic location associated with the mobile unit identification number that exceeds an interval defined by said updating system, and in response thereto updating said data storage system to identify an updated geographic location for said mobile unit identification number.

2. The system of claim 1 wherein
said mobile unit identification number is associated with a mobile communication device, and
said updating system comprises a positioning system obtaining an exact geographic location for a mobile communication device, and comparing said exact geographic location to a previously determined exact geographic location and said interval.

3. The system of claim 2 wherein said mobile communication device is a cellular telephone.

4. The system of claim 1 wherein said interval requires updating at a preset time interval.

5. The system of claim 1 wherein said interval requires updating according to a distance between the geographic location associated with the mobile unit identification number and a correct geographic location.

6. The system of claim 1 wherein said interval requires updating upon approach or movement across a geographic boundary.

7. The system of claim 6 wherein said geographic boundary is a political boundary between two governmental authorities.

8. The system of claim 6 wherein said geographic boundary is a telecommunications boundary between territories allocated to different telecommunications services providers.

9. A cellular communications system comprising:
a cellular communication network comprising a plurality of cell sites and a plurality of mobile units, for radio frequency communication between said cell sites and mobile units, at least one of said cell sites receiving an identification of a specific mobile unit, said cellular communication network communicating with said specific mobile unit via a cell site chosen based upon signal strength, and
a positioning system obtaining a position for said specific mobile unit identifying an exact geographic location of the specific mobile unit, and forwarding said exact geographic location and specific mobile unit identification for use in subsequent services.

10. The cellular communications system of claim 9 wherein said specific mobile unit transmits a position signal.

11. The cellular communications system of claim 10 wherein said specific mobile unit derives said position through the use of radio frequency positioning signals.

12. The cellular communications system of claim 11 wherein said specific mobile unit derives said position through the use of a global positioning satellite system.

13. The cellular communications system of claim 10 wherein said specific mobile unit comprises a GPS receiver connected to logic circuitry in said specific mobile unit.

14. The cellular communications system of claim 13 wherein said specific mobile unit includes a duplexer.

15. The cellular communications system of claim 14 wherein said specific mobile unit includes a GPS receiver located between said duplexer and said logic circuitry.

16. The cellular communications system of claim 9 wherein said cellular communication network compares said exact geographic location to geographic locations of the cell sites in the cellular communications network.

17. The cellular communications system of claim 16 wherein said cellular communications network selects a chosen cell site for use by said specific mobile unit based on said comparison of said exact geographic location to geographic locations of cell sites, and establishes communication between said specific mobile unit and said chosen cell site based on the exact geographic location of the specific mobile unit.

18. The cellular communications system of claim 16 wherein said cellular communication network determines one of the geographic locations of one of the cell sites using a look-up table.

19. The cellular communications system of claim 9 wherein said positioning system receives said exact geographic location from voice and data communication signals received by said cells sites.

20. The cellular communications system of claim 9 wherein said data storage system makes said exact geographic location accessible for emergency services provisioning.

21. The cellular communications system of claim 9 wherein said data storage system makes said exact geographic location available for one or more of rate, message unit, tax, billing or location services provisioning.

22. The cellular communications system of claim 9 wherein said positioning system makes said exact geographic location accessible to provide proper services for said exact geographic location.

23. A method of providing a location-based service comprising the steps of:
obtaining a unique mobile identification number from a mobile unit via a cellular communication system comprising a plurality of networked antennas, the mobile unit being in radio contact with at least one of the networked antennas;
receiving a request for a location-based service from the mobile unit;
acquiring positional data corresponding to an exact geographic location for the mobile unit via the cellular communication system;
comparing the positional data with stored geographic data for the location-based service; and
responding to the request for a location-based service based on the comparison.

24. The method of claim 23, wherein the step of responding to the request comprises routing a communication involving the mobile unit based on the comparison.

25. The method of claim 24, wherein the request is an emergency call.

26. The method of claim 23, wherein the step of responding to the request comprises furnishing the positional data.

27. The method of claim 26, wherein the request is an emergency call.

28. The method of claim 23, wherein the positional data is acquired using a global positioning system.

29. The method of claim 28, wherein the positional data is acquired using triangulation.

30. The method of claim 23, wherein the positional data is acquired using triangulation.

31. The method of claim 23, wherein the positional data is acquired using a system selected from the group consisting of a global positioning system and triangulation.

32. The method of claim 23, further comprising the step of furnishing the positional data for use in the location-based service.

* * * * *

UNITED STATES PATENT AND TRADEMARK OFFICE
Certificate

Patent No. 7,289,763 B2                                                                     Patented: October 30, 2007

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Everett Dennison, Canfield, OH (US); Timothy J. Duffy, West Middlesex, PA (US); Gregory T. Pauley, Canfield, OH (US); Scott L. Jones, Sharon, PA (US); Albert H. Pharis, Jr., Canfield, OH (US); Warren P. Williamson, IV, Loveland, OH (US); Edwin L. Nass, Canfield, OH (US); and Deborah J. Shale, Poland, OH (US).

Signed and Sealed this Twenty-third day of October 2012.

<div style="text-align:right">

RICHARD CHAN
*Supervisory Patent Examiner*
Art Unit 2618
Technology Center 2600

</div>

UNITED STATES PATENT AND TRADEMARK OFFICE
Certificate

Patent No. 7,289,763 B2                                                                 Patented: October 30, 2007

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Everett Dennison, Canfield, OH (US); Timothy J. Duffy, West Middlesex, PA (US); Gregory T. Pauley, Canfield, OH (US); Scott L. Jones, Sharon, PA (US); Albert H. Pharis, Jr., Canfield, OH (US); Warren P. Williamson, IV, Loveland, OH (US); Edwin L. Nass, Canfield, OH (US); and Deborah J. Shale, Poland, OH (US).

Signed and Sealed this Twenty-seventh Day of November 2012.

<div style="text-align:right">
TEMESGHEN GHEBRETINSAE<br>
*Supervisory Patent Examiner*<br>
Art Unit 2618<br>
Technology Center 2600
</div>

US007289763C1

(12) INTER PARTES REEXAMINATION CERTIFICATE (776th)
United States Patent
Dennison et al.

(10) Number: US 7,289,763 C1
(45) Certificate Issued: *Dec. 24, 2013

(54) CELLULAR TELEPHONE SYSTEM THAT USES POSITION OF A MOBILE UNIT TO MAKE CALL MANAGEMENT DECISIONS

(75) Inventors: Everett Dennison, Canfield, OH (US); Timothy J. Duffy, West Middlesex, PA (US); Gregory T Pauley, Canfield, OH (US); Scott L. Jones, Sharon, PA (US); Albert H. Pharis, Jr., Canfield, OH (US); Warren P. Williamson, IV, Loveland, OH (US)

(73) Assignee: Emsat Advanced Geo-Location Technology, LLC, Loveland, OH (US)

Reexamination Request:
No. 95/001,512, Dec. 14, 2010

Reexamination Certificate for:
Patent No.: 7,289,763
Issued: Oct. 30, 2007
Appl. No.: 10/993,477
Filed: Nov. 22, 2004

(*) Notice: This patent is subject to a terminal disclaimer.

Related U.S. Application Data

(60) Division of application No. 09/662,613, filed on Sep. 15, 2000, now Pat. No. 6,847,822, which is a continuation of application No. 08/848,082, filed on Mar. 21, 1996, now Pat. No. 6,324,404, which is a continuation-in-part of application No. 08/555,884, filed on Oct. 23, 1995, now Pat. No. 5,546,445, which is a continuation-in-part of application No. 08/402,976, filed on Mar. 13, 1995, now abandoned, which is a continuation of application No. 08/057,833, filed on May 7, 1993, now abandoned, which is a continuation of application No. 07/813,494, filed on Dec. 26, 1991, now Pat. No. 5,235,633.

(51) Int. Cl.
*H04B 7/185* (2006.01)

(52) U.S. Cl.
USPC ...... 455/12.1; 455/13.1; 455/422.1; 455/436; 455/517

(58) Field of Classification Search
None
See application file for complete search history.

(56) References Cited

To view the complete listing of prior art documents cited during the proceeding for Reexamination Control Number 95/001,512, please refer to the USPTO's public Patent Application Information Retrieval (PAIR) system under the Display References tab.

*Primary Examiner* — Charles Craver

(57) ABSTRACT

A cellular telephone system has call management decisions made based on the exact geographic location of the mobile unit. These call management decisions include billing and taxing decisions, cell site selection, frequency selection and even cellular system selection. The decisions are continuously updated during a call whereby decisions can be made and changed regardless of where a call originated. Cell site location, and even cellular system selection, can be made in a specific manner to best serve the needs of the mobile user, the cellular system as well as the public. It is even possible for a cellular system to locate one or more of its cell sites in the geographic area served by another cellular system. In some cases, cellular systems might even share cell sites.

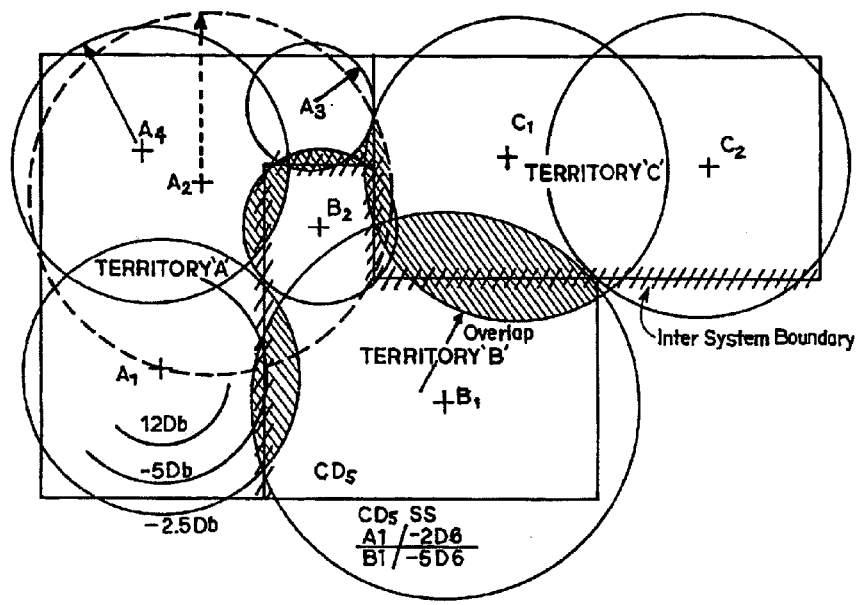

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-6, 9-15 and 19-32 are cancelled.

Claims 7, 8 and 16-18 were not reexamined.

\* \* \* \* \*